United States Patent
Risch et al.

(10) Patent No.: US 12,164,916 B2
(45) Date of Patent: Dec. 10, 2024

(54) METHOD AND SYSTEM FOR DATA PROCESSING

(71) Applicant: Stream Analyze Sweden AB, Uppsala (SE)

(72) Inventors: Tore Risch, Uppsala (SE); Johan Risch, Uppsala (SE)

(73) Assignee: Stream Analyze Sweden AB, Uppsala (SE)

( * ) Notice: Subject to any disclaimer, the term of this patent is extended or adjusted under 35 U.S.C. 154(b) by 0 days.

(21) Appl. No.: 18/043,063

(22) PCT Filed: Aug. 18, 2021

(86) PCT No.: PCT/SE2021/050809
§ 371 (c)(1),
(2) Date: Feb. 27, 2023

(87) PCT Pub. No.: WO2022/045945
PCT Pub. Date: Mar. 3, 2022

(65) Prior Publication Data
US 2023/0259361 A1    Aug. 17, 2023

(30) Foreign Application Priority Data

Aug. 28, 2020 (SE) .................... 2051000-4

(51) Int. Cl.
| | |
|---|---|
| *G06F 8/76* | (2018.01) |
| *G06F 3/0486* | (2013.01) |
| *G06F 8/34* | (2018.01) |
| *G06F 16/242* | (2019.01) |
| *G06F 16/2455* | (2019.01) |
| *H04L 67/00* | (2022.01) |

(Continued)

(52) U.S. Cl.
CPC .............. *G06F 8/76* (2013.01); *G06F 3/0486* (2013.01); *G06F 8/34* (2013.01); *G06F 16/2428* (2019.01);
(Continued)

(58) Field of Classification Search
CPC ........... G06F 16/2471; G06F 16/24568; G06F 16/2455; G06F 8/76; G06F 16/2428; G06F 3/0486; G06F 8/34
See application file for complete search history.

(56) References Cited

U.S. PATENT DOCUMENTS

| | | |
|---|---|---|
| 2007/0233655 A1 | 10/2007 | Engels |
| 2013/0166712 A1 | 6/2013 | Chandramouli et al. |

(Continued)

FOREIGN PATENT DOCUMENTS

| | | |
|---|---|---|
| AU | 2012362829 A1 | 7/2014 |
| EP | 3668174 A1 | 6/2020 |
| WO | 2020131497 A1 | 6/2020 |

OTHER PUBLICATIONS

J. Ding and D. Fan, Edge Computing for Terminal Query Based On IoT, 2019 IEEE International Conference on Smart Internet of Things (SmartIoT). 978-1-7281-3488-8/19/$31.00 © 2019 IEEE.

(Continued)

*Primary Examiner* — S. Sough
*Assistant Examiner* — Cheneca Smith
(74) *Attorney, Agent, or Firm* — Noréns Patentbyrå AB

(57) ABSTRACT

System comprising several edge computing devices (ECDs), each equipped with a sensor, a memory, a Central Processing Unit (CPU), and a digital communication interface, enabling the ECD to communicate across a digital communication network. Each ECD is equipped with an interpreting software function, designed to execute on the CPU and interpret computer code received via the digital communication interface and stored in the memory. This is based on a query language with a predetermined syntax that defines queries sent from a particular requesting ECD to one or multiple responding ECDs. The system also includes an interactive Graphical User Interface (GUI) that allows a user to visually view and interactively change computer code stored in (Continued)

various ECDs using a visual notation system. The GUI communicates updated computer code to any concerned ECDs reflecting changes made by the user and receives computer code stored in the ECDs to provide a visual view.

18 Claims, 8 Drawing Sheets

(52) U.S. Cl.
CPC ........ *G06F 16/24568* (2019.01); *H04L 67/34* (2013.01)

(56) References Cited

U.S. PATENT DOCUMENTS

| | | |
|---|---|---|
| 2016/0328216 A1 | 11/2016 | Leonelli et al. |
| 2017/0060574 A1 | 3/2017 | Malladi et al. |
| 2018/0032915 A1 | 2/2018 | Nagaraju et al. |
| 2018/0054850 A1 | 2/2018 | Leonelli et al. |
| 2018/0218046 A1* | 8/2018 | Woo ...................... G06F 16/248 |
| 2019/0236194 A1* | 8/2019 | James ............... G06F 16/24542 |
| 2020/0112609 A1* | 4/2020 | Hardman, III .......... H04L 45/22 |
| 2020/0213419 A1 | 7/2020 | Ren et al. |

OTHER PUBLICATIONS

International preliminary report on patentability, ISA Swedish Intellectual property office. Stockholm, Dec. 13, 2022.
European search report issued by the European Patent Office on Dec. 14, 2023.
Schweiger et al., BMC Bioinformatics 2014 SPARQLGraph: a web-based platform for graphically querying biologcl semantic web databases.

* cited by examiner

METHOD AND SYSTEM FOR DATA PROCESSING

FIELD OF THE INVENTION

The present invention relates to a method and a system for data processing. In particular, the present method and system relates to data processing in an Internet of things (IoT) environment comprising a plurality of physically separated edge devices and possibly one or several central devices, all such devices being interconnected for digital communication such as over the internet.

More particularly, the present invention relates to the processing of data collected by such edge devises, and for producing processed data useful for automatically determining and performing various actions.

BACKGROUND OF THE INVENTION

In IoT applications, it is known to use more or less autonomous edge devices, that can be used as sensors and/or actors in an IoT system. Such edge devices may be based on hardware and also more or less on software. For instance, such edge devices may be arranged with purpose-made hardware implementing certain logic, or be generally programmable, running operating systems such as FreeRTOS or Android®.

Normally, once such a system is installed, together with edge devices, the installation tends to be relatively static. For instance, in many conventional systems activities such as add-on installations, testing, simulations, functionality changes and so forth are time-consuming. Even in case edge devices can be configured using parameters or similar, their functionality may be limited to use cases envisioned by an installing operator.

Hence, one problem with conventional distributed IoT systems is flexibility of functionality, both in terms of initial design, deployment and further development and updates. This is particularly true when dealing with existing and legacy hardware.

Another problem is performance and scalability, in view of the massive amounts of measured data that many such systems need to handle. Often real time requirements are challenging, and available hardware resources at each edge component are often limited.

Yet another problem is maintenance, including testing and simulating new or hypothetical operation scenarios.

Another problem is usability. It would be desirable for a system not to require deep knowledge in programming or of the technical details of the system to be able to deploy, use, develop and maintain it in a broad spectrum of applications.

It would hence be desirable to provide a massively scalable IoT system, including a plurality of edge devices and possibly one or several central units, which offers better flexibility in terms of functionality, both during design, deployment, further development and maintenance, and which is simple to deploy.

The present invention solves at least some of the above described problems.

BRIEF SUMMARY OF THE INVENTION

Hence, some embodiments of the invention relate to a system comprising several edge computing devices, each edge computing device comprising a sensor; a memory; a Central Processing Unit (CPU); and a digital communication interface, arranged to allow the edge computing device in question to communicate digitally across a digital communication network, wherein each edge computing device is arranged with a respective interpreting software function, arranged to execute on said CPU and to interpret computer code, received via said digital communication interface and stored in said memory, according to a query language having a predetermined syntax; wherein said syntax is arranged to define queries the results of which are streams of data; wherein each edge computing device is arranged to, when interpreting said computer code, produce a result to at least one query defined by said computer code and to communicate said result via said digital communication interface, wherein said syntax allows said query to be defined in terms of a calculation to be performed based on a measured value from said sensor, and wherein the edge computing device in question is arranged to perform, as a part of said interpretation, said calculation.

Some embodiments of the invention relate to a method for collecting data in a system comprising several edge computing devices, comprising a first edge computing device and a second edge computing device, each edge computing device comprising a respective sensor, a respective memory, a respective Central Processing Unit (CPU) and a digital communication interface arranged to allow the edge computing device in question to communicate digitally across a digital communication network, wherein the method comprises the steps a) providing each of said plurality of edge computing devices with a respective interpreting software function, arranged to execute on the CPU of the edge computing device in question and to interpret computer code, received via said digital communication interface of the edge computing device in question and stored in said memory of the edge computing device in question, according to a query language having a predetermined syntax, said syntax being arranged to define queries the results of which are streams of data;

b) the first edge computing device providing, via the digital communication interface of the second edge computing device, computer code of said type defining at least one query using said syntax;

c) the second edge computing device interpreting said computer code, the interpretation comprising the second edge computing device performing a calculation based on a measured value from a sensor of the second edge computing device, the query being defined in terms of the calculation to be performed;

d) the second edge computing device producing a result to said at least one query; and e) the second edge computing device communicating said result via said digital communication interface of the second edge computing device to said first edge computing device.

Some embodiments of the invention relate to a system comprising several edge computing devices, comprising a first edge computing device and a second edge computing device, each edge computing device comprising a sensor; a memory; a Central Processing Unit (CPU); and a digital communication interface, arranged to allow the edge computing device in question to communicate digitally across a digital communication network, wherein each edge computing device is arranged with a respective interpreting software function, arranged to execute on said CPU and to interpret computer code, received via said digital communication interface and stored in said memory, according to a query language having a predetermined syntax; wherein said syntax is arranged to define queries the results of which are streams of data; wherein a first interpreting software function of said type, executing on the first edge computing device, is arranged to pose a first query of said type to the second edge computing device, wherein a second interpreting software function of said type, executing on the second edge computing device, is arranged to, in response to said first query being received by the second edge computing device, generate a second stream of data and to communicate the second stream of data to the first edge computing device via a digital communication interface of the first edge computing device; wherein the first interpreting software function is arranged to perform a first calculation using said second stream of data to calculate a first result; and wherein the first interpreting software function is arranged to, before performing said first calculation, perform a second preprocessing of said second stream of data, resulting in a preprocessed second stream of data used in said first calculation, the second preprocessing being arranged to transform the second stream of data so that it adheres to a predefined global data ontology.

Some embodiments of the invention relate to a method for collecting data in a system comprising several edge computing devices, comprising a first edge computing device and a second edge computing device, each edge computing device comprising a respective sensor, a respective memory, a respective Central Processing Unit (CPU) and a digital communication interface arranged to allow the edge computing device in question to communicate digitally across a digital communication network, wherein the method comprises the steps a) providing each of said plurality of edge computing devices with a respective interpreting software function, arranged to execute on the CPU of the edge computing device in question and to interpret computer code, received via said digital communication interface of the edge computing device in question and stored in said memory of the edge computing device in question, according to a query language having a predetermined syntax, said syntax being arranged to define queries the results of which are streams of data;

b) a first interpreting software function of said type, executing on the first edge computing device, posing a first query of said type to the second edge computing device;

c) a second interpreting software function of said type, executing on the second edge computing device, in response to said first query being received by the second edge computing device, generating a second stream of data and communicating the second stream of data to the first edge computing device via a digital communication interface of the first edge computing device;

d) the first interpreting software function performing a second preprocessing of said second stream of data, resulting in a preprocessed second stream of data used in said first calculation, the second preprocessing transforming the second stream of data so that it adheres to a predefined global data ontology; and e) the first interpreting software function performing a first calculation using said preprocessed second stream of data to calculate a first result.

Some embodiments of the invention relate to a system comprising several edge computing devices, each edge computing device comprising a sensor; a memory; a Central Processing Unit (CPU); and a digital communication interface, arranged to allow the edge computing device in question to communicate digitally across a digital communication network, wherein each edge computing device is arranged with a respective interpreting software function, arranged to execute on said CPU and to interpret computer code, received via said digital communication interface and stored in said memory, according to a query language having a predetermined syntax; wherein said syntax is arranged to define queries sent from a respective requesting edge computing device to one or several respective responding edge computing devices, in terms of respective calculations to be performed by the responding edge computing devices in question based on a measured value from a respective sensor of the responding edge computing device, the results of which queries are streams of data returned to the requesting edge computing device; wherein said query language is isomorph to a visual notation system; wherein the system further comprises an interactive Graphical User Interface (GUI), allowing a user of the system to visually view computer code stored in several different of said edge computing devices using said syntax and defining several queries using said query language, including interrelations between requesting and responding edge computing devices defined by the queries in question, using said visual notation system; and wherein the interactive GUI is further arranged to allow said user to graphically and interactively change one or several of said queries using said visual notation system, and wherein the interactive GUI as a result is arranged to communicate updated computer code of said type to any concerned edge computing devices reflecting said changes.

Some embodiments of the invention relate to a method for collecting data in a system comprising several edge computing devices, each edge computing device comprising a respective sensor, a respective memory, a respective Central Processing Unit (CPU) and a digital communication interface arranged to allow the edge computing device in question to communicate digitally across a digital communication network, wherein the method comprises the steps f) providing each of said plurality of edge computing devices with a respective interpreting software function, arranged to execute on the CPU of the edge computing device in question and to interpret computer code, received via said digital communication interface of the edge computing device in question and stored in said memory of the edge computing device in question, according to a query language having a predetermined syntax, said syntax being arranged to define queries sent from a respective requesting edge computing device to one or several respective responding edge computing devices, in terms of respective calculations to be performed by the responding edge computing devices in question based on a measured value from a respective sensor of the responding edge computing device, the results of which queries are streams of data returned to the requesting edge computing device, and said query language being isomorph to a visual notation system;

g) providing an interactive Graphical User Interface (GUI), allowing a user of the system to visually view computer code stored in several different of said edge computing devices using said syntax and defining several queries using said query language, including interrelations between requesting and responding edge computing devices defined by the queries in question, using said visual notation system;

h) said user using the interactive GUI to graphically and interactively change one or several of said queries using said visual notation system; and i) the interactive GUI as a result communicating updated computer code of said type to any concerned edge computing devices reflecting said changes.

In some embodiments, the computer code is plaintext. In some embodiments, the computer code is precompiled.

In some embodiments, said stream of data is a stream of data objects, such as numbers, tensors or objects representing individual edge computing devices.

In some embodiments, each sensor and/or edge computing device is referable, according to said syntax, using a global namespace or set of properties. The system may further comprise a central namespace server arranged with a database comprising information defining names for said edge computing devices. The database may further comprise information regarding network address locations for each of said edge computing devices. The database may further comprise metadata information regarding edge computing devices, and the first interpreting software function may be arranged to use said metadata to determine parameter values used in a preprocessing.

In some embodiments, a stream of objects of said result is an endless stream of objects, calculated by the edge computing device continuously or intermittently over time. The stream of objects may be communicated via said digital communication interface.

In some embodiments, said syntax allows said query to refer to information received by a first (or requesting) edge computing device from a second (or responding) edge computing device via said global namespace, said information then being used by the interpreting software function executing on the first edge computing device to calculate said result. The interpreting software function executing on the first edge computing device may be arranged to cause the first edge computing device to query said information from the second edge computing device, as a consequence of the query referring to the second edge computing device or to a sensor comprised therein.

In some embodiments, the system further comprises a third edge computing device having a third interpreting software function of said type, executing on the third edge computing device. The first interpreting function may be arranged to pose the first query both to the second edge computing device and to the third edge computing device. The third interpreting software function may be arranged to, in response to said first query being received by the third edge computing device, generate a third stream of data and to communicate the third stream of data to the first edge computing device via the digital interface of the first edge computing device. The first interpreting software function may be arranged to perform said first calculation using both said second stream of data and said third stream of data to calculate said first result, the first interpreting software function may be arranged to perform a third preprocessing of said third stream of data, resulting in a preprocessed third stream of data used in said first calculation, said third preprocessing being arranged to transform the third stream of data so that it adheres to a global data ontology. Each of said first preprocessing and said second preprocessing may use parameter values to perform the preprocessing in question. The parameter values may be different for the second preprocessing and the third preprocessing.

In some embodiments, a preprocessing is performed based on metadata regarding a respective edge computing device from which the data stream in question is received, said metadata being defined via said digital communication interface of said first edge computing device.

In some embodiments, the result of said query made by the first edge computing device may comprise an endless stream of objects received by the first edge computing device from the second edge computing device, calculated by the second edge computing device continuously or intermittently over time and communicated to the first edge computing device via the digital communication interface of the first edge computing device.

In some embodiments, the interpreting software function executing on the first edge computing device is arranged to cause the first edge computing device to pose said first query as a consequence of a query of said type received by the first edge computing device. The query received by the first edge computing device may refer to the second edge computing device and/or to a sensor comprised in the second edge computing device.

In some embodiments, said digital communication interface of said first edge computing device comprises at least one wrapper mechanism arranged to transform a received stream of data from an external data format to a data format internal to said query language.

In some embodiments, the preprocessing comprises at least one of a mapping of a name standard, said name standard being local to an edge computing device, to a global name standard; a measurement unit conversion; and a measurement data calibration.

In some embodiments, different ones of said edge computing devices comprise different hardware configurations. Said interpretation software function may be specifically adapted to the respective hardware configuration of each of said different edge computing devices, whereas said syntax may be identical for each of said different edge computing devices.

In some embodiments, the interpreting software function of a first edge computing device is arranged to accept a subscription request from an alpha edge computing device for an individual query processed by the interpreting software function of the first edge computing device, wherein the alpha edge computing device did not pose the query in question to the first edge computing device.

In some embodiments, each of said objects is processed by a callback function being a part of said interface and being executed in a central server or on the edge device.

In some embodiments, said memory comprises an object-oriented database.

In some embodiments, said query language is a object-oriented query language.

In some embodiments, said syntax allows for different conditional logic-depending execution paths, interpreted and executed by said interpreting software function.

In some embodiments, said query language is arranged to allow the definition of stateful functions to be used in queries.

The query language may also be partly procedural.

In some embodiments, said query language is isomorph to a visual notation system, and the system may further comprise an interactive Graphical User Interface (GUI), allowing a user of the system to visually view computer code stored in several different of said edge computing devices using said syntax and defining queries using said query language, including interrelations between edge computing devices defined by the queries in question, using said visual notation system. The interactive GUI may further be arranged to allow said user to change one or several of said queries using said visual notation system, and the interactive GUI may be arranged to, as a result, communicate updated computer code to any concerned edge computing devices reflecting said changes. Said updated computer code may then be communicated to said concerned edge computing device or devices on-the-fly by the interactive GUI. The interactive GUI may further be arranged to request, from said edge computing devices, computer code stored therein, and to provide said visual view based on computer code received from said edge computing devices in response to this request.

In some embodiments, each edge computing device is arranged to discard at least some, preferably all, measurement data measured by said sensor, instead of storing it in said memory, after having communicated said measurement data and/or a piece of information calculated based on said measurement data over said digital communication interface.

In some embodiments, the system further comprises a distributed or monolithic central server, in relation to which each of said edge computing devices has a client role, and wherein all communication between individual edge computing devices takes place via said central server.

In some embodiments, said interpreting software function comprises an external Application Programming Interface, API, arranged to allow expressions in said query language to call external computer code and/or arranged to allow external computer code to call expressions in said query language.

In some embodiments, said interpreting software function comprises a machine learning function, arranged to define, train and execute a machine learning model such as a neural network. The memory of said edge computing device may comprise a defined and trained machine learning function which is referred to by the query interpreted by the interpreting software function executing on the edge computing device in question. The interpreting software function in question may be arranged to train said defined machine learning function based on said results of said query.

BRIEF DESCRIPTION OF THE DRAWINGS

In the following, the invention will be described in detail, with reference to exemplifying embodiments of the invention and to the enclosed drawings, wherein.

In the Figures, the same reference numerals are used to denote same or corresponding parts.

DETAILED DESCRIPTION OF THE INVENTION

Figure 1:
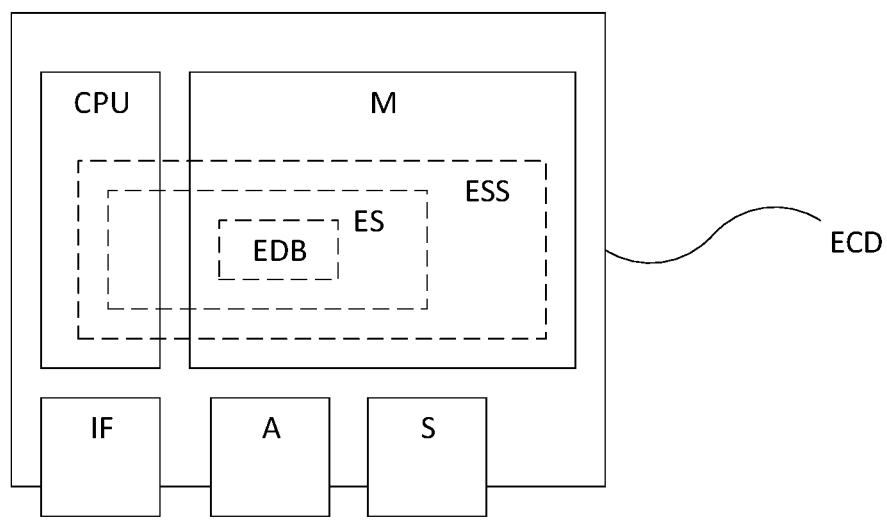
FIG. 1 shows a client device according to the present invention.
Figure 2:
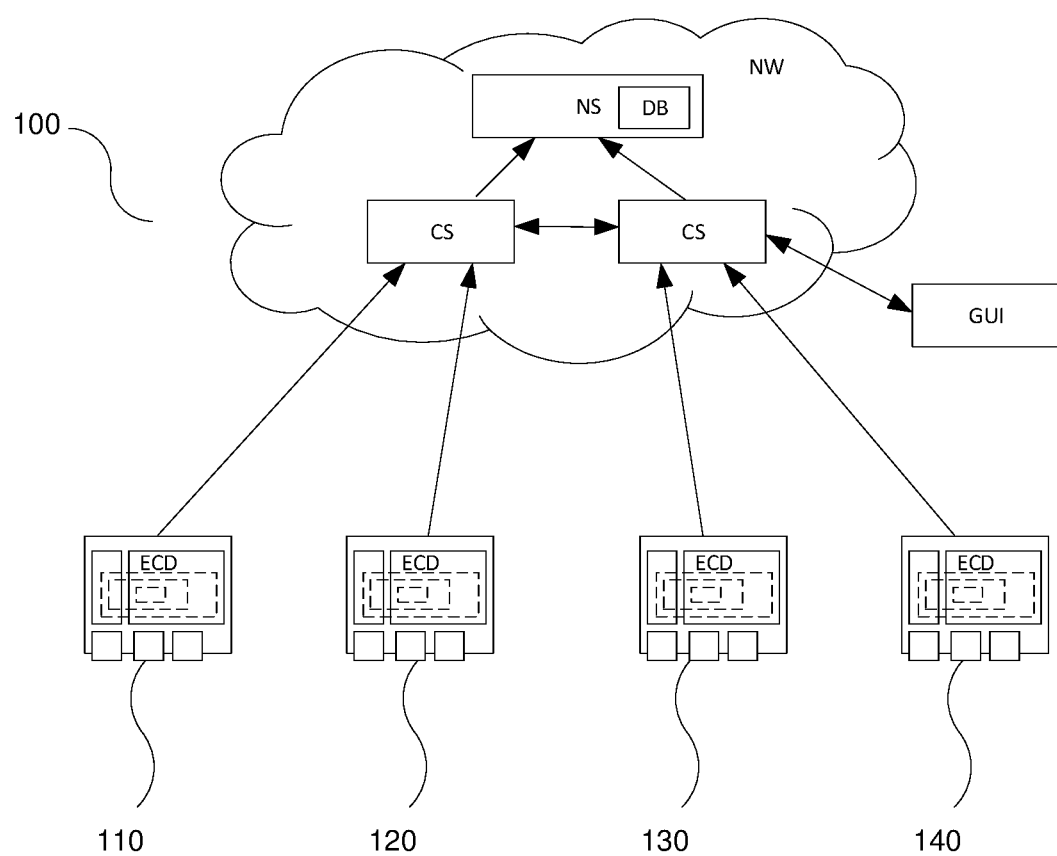
FIG. 2 is an overview of a system according to the present invention, suitable for performing a method according to the present invention.

The present invention relates to a system 100 as is generally shown in FIG. 2, comprising several edge computing devices (EDC) 110, 120, 130, 140 of the general type shown in FIG. 1.

Each such edge computing device EDC is a piece of computing hardware, comprising a respective sensor S, a memory M, a Central Processing Unit CPU and a digital communication interface IF.

The sensor S may be any type of sensor arranged to measure a parameter at the edge computing device EDC in question. The parameter may represent a physical property at or near the edge computing device EDC, whereby the sensor may a light sensor; a camera sensor; a temperature sensor; a sound sensor; an electric or magnetic sensor, such as a current, voltage, impedance or magnetic field sensor; an orientation sensor, such as a gyro or an accelerometer; a pressure sensor; a chemical sensor, such as a pH sensor or a sensor for sensing particular solid state, liquid and/or gaseous chemical substances; and so forth. The parameter may also represent a logical property available for reading by the edge computing device EDC, such as a settable gate; a push button; a logic state delivered by an auxiliary device; and so forth.

What is important in this context is that the sensor S is arranged to sense a certain condition at the "edge" location of the edge computing device EDC. That the computing device is an "edge" device means that it is physically located in a location where the sensed condition is relevant. The system 100 in general comprises a plurality of such edge computing devices EDC, each being located in a respective such physical location, the physical location for different edge computing devices EDC generally being different. This means that the system 100 covers a plurality of such physical locations where such measurements can be performed by said edge computing devices ECD. This way, data sensed from a plurality of different physical locations can be concatenated in the ways described herein, by one or several central servers CS in contact with said edge computing devices, to form a total view of some type of situation involving said plurality of physical locations.

The sensor S may comprise an analog to digital converter, to convert a sensed analogue value, such as a temperature, to a digital representation which may be fed to said CPU.

Of course, each edge computing device ECD may comprise more than one sensor S, of the same and/or different types. All such sensors are connected to the memory M, such as via a suitable digital communication bus, so that a computer software function executing on the CPU can access measurement values received from the sensor S in question.

Similarly, each edge computing device ECD may furthermore comprise one or several actuators A, such as light, movement, electrical or magnetic actuators, as the case may be. All such actuators are connected to the memory M, such as via said digital communication bus, so that a computer software function executing on the CPU can impart actuation at the actuator A in question.

The memory M may be a RAM memory, and is preferably a digital memory interconnected to both the sensor S and the CPU.

The CPU may be any suitable CPU, such as a single-core or multi-core CPU.

The edge computing device EDC may be a physically standalone, programmable device. It may be a general-purpose programmable device, or a programmable device which is hardware limited to particular uses. The important thing in this context is that it is programmable using machine code that can be fed into the memory M from an external source and executed by the CPU. Only by way of example, the edge computing device EDC may be a programmable sensor or a PC laptop computer.

The edge computing device EDC may comprise an operating system, arranged to execute on the CPU and provide higher-level services to computer software executing on the CPU within the environment provided by the operating system. Such an operating system is, however, not necessary in all embodiments of the present invention.

The digital communication interface IF may be any suitable digital wired or wireless interface, arranged to allow the edge computing device ECD to communicate with external devices. For instance, the interface may be an internet interface.

In particular, as illustrated in FIG. 2, the interface IF of each edge computing device ECD allows it to communicate digitally across a digital communication network NW, such as the internet, to which all system 100 devices are connected for communication.

In particular, one or several central servers CS, NS may be connected to said network NW for communication with the edge computing devices ECD. Each edge computing device ECD is connected to at least one, such as exactly one, such central server CS. The central servers CS may in turn be connected in one or several hierarchies, such as in a tree structures wherein a leaf (or client) central server CS is connected to a parent (or server) central server CS.

FIG. 2 also shows a particular type of central server, namely a namespace server NS (see below).

That the server is "central" means that it defines a functionality which is logically centralized, in the sense that it is accessible at a single well-defined logical place. For instance, the central server may be a conventional standalone server, in the form of a single piece of hardware having computer software executing thereon. However, each central server may also be embodied as a distributed logical server, such as a defined server functionality reachable via an internet "cloud"-type functionality. Hence, several such central servers CS may actually partly or fully execute on a common hardware platform, as the case may be. Such design options are selected from the point of view of, for instance, system 100 scalability, performance, security and resilience.

The present system 100 can be made very scalable, and may comprise at least 1000, such as at least 10000 or even at least 100000 connected edge computing devices ECD that are connected to one and the same system 100 in a way so that they can all communicate directly or indirectly with each other across the network NW as described herein.

Each central server CS may serve at least 10 edge computing devices ECD, such as at least 100 edge computing devices ECD. Each central server CS may furthermore serve at the most 10000 edge computing devices ECD, such as at the most 1000 edge computing devices ECD.

It will become apparent from the present description that each edge computing device ECD can also refer to other edge computing devices ECD across the network NW. Hence, data may flow in a tree-like structure formed by the system 100 comprising one or several layers of edge computing devices ECD forming leaves and nodes close to leaves in said tree structure, and also one or several layers of central servers CS further away rom such leaves.

It should also be kept in mind that the interpreting software function ES described herein may be executed both on edge computing devices ECD and central servers CS, whereby both devices with their own sensors S and more centrally located devices that concatenate data streams rather than process data measured using own sensors can process queries of the type described herein.

Hence, according to the present invention each edge computing device ECD is arranged with a respective interpreting software function ES, illustrated in a simplified way in FIG. 1. The interpreting software function ES is arranged to execute on the respective CPU of the edge computing device ECD in question, such as locally on the edge computing device ECD, such as entirely locally on the edge computing device ECD.

"Local execution", as used herein, means that the software code embodying the software function ES is loaded directly into the CPU of the edge computing device ECD and executed directly thereon, without any of the logic or calculation functionality taking place on CPUs of any external devices. Note that this does not rule out that data, in the sense of information, is communicated to and/or from the edge computing device ECD in question, which data may be used as a basis for the execution of the software function ES. For instance, the numeric working data product of one edge computing device ECD may be consumed by another edge computing device ECD to be used therein in further calculations.

However, a "local execution" of a piece of software rules out a distributed execution, for instance in the sense that different calculations to be performed by the software function ES are performed in different threads executed on different, disjoint hardware devices. The present inventor foresees that individual edge computing devices ECD may be arranged to share some software function ES functionality, even in a distributed execution environment involving a subset of such edge computing devices ECD. However, the present invention provides the greatest advantages in a hardware environment in which CPU-demanding calculations are performed as far out on the leaves (at the individual edge computing devices ECD) as possible, exploiting the CPU resources of all connected devices.

The software function ES is an interpreting software function. This means that it may accept information having a predetermined format, to step through the information in a particular order, and to interpret or execute one piece of said information at a time. Such information processed by the software function ES is herein denoted "computer code", and is received by the edge computing device ECD in question via its digital communication interface IF and stored in its memory M. The computer code in turn comprises definitions, statements and/or instructions that the interpreting software function ES parses, processes and executes. In this sense, a conventional Java virtual machine is an interpreting software function, albeit arranged to interpret Java code rather than computer code according to the present invention.

Actually, according to the present invention the received, stored and interpreted computer code is formatted according to a query language having a predetermined syntax. Herein, a "query language" is a language allowing a user to define queries onto a particular data set. For instance, conventional SQL is a query language, albeit not according to the present invention.

Namely, the syntax of said query language is arranged to define queries the results of which are streams of data. As used herein, a "stream" of data is a set of data pieces having a time dimension, preferably a set of data pieces continuously produced, perhaps even in real-time. Hence, each such piece of data may be associated with, or comprise, a timing information, such as a time of measurement, a time of sending, a time of reception and so forth. For instance, the edge computing device ECD may comprise a clock, which may be arranged to provide a time associated with each sensor S measurement, such as before the measurement in question is processed by said software function ES.

In some embodiments of the present invention, each edge computing device ECD is arranged to, when interpreting said computer code using said software function ES, produce a result to at least one query defined by said computer code. As mentioned, the result may be a stream of data. The edge computing device ECD is then further arranged to communicate the result in question, via its digital communication interface IF, to a querying device, such as a different edge computing device ECD or a central server CS.

In particular, said syntax may be arranged to allow queries in general, and in particular the query now in question, to be defined in terms of a calculation to be performed based on a measured value from the sensor S of the edge computing device ECD in question. Hence, the query language-formatted computer code interpreted by the software function may comprise a properly formatted reference to a particular sensor S of the edge computing device ECD, whereby the interpretation involves reading a current value of the sensor S in question and using that read current value in one or several calculations based on the result of which the query result is determined.

In some embodiments, it is the edge computing device ECD in question (the one on which the software function ES executes) that is arranged to perform, as a part of said interpretation, said calculation.

The system 100 according to the present invention may be designed so that it is self-contained in the sense that it is not dependent on other, external, systems for its operation. Still, it may be designed to provide powerful extensibility mechanisms to enable tight integration with software on many different hardware platforms. One key aspect of this is the interpreting software function ES executing on each edge computing device ECD. Namely, this interpreting software function ES may be downloaded onto each individual edge computing device ECD and installed for execution on the respective CPU of the edge computing device ECD in question. Once downloaded and installed, the software function ES of each such edge computing device ECD can interpret said computer code as long as the computer code adheres to said well-defined syntax.

In practice, the software function can be ported (translated) to be executable on many different hardware/software environments (such as different processor architectures and/or different operating systems). In this context, it is preferred that the interpreting software function ES is specifically adapted to each type of such hardware/software environments, but providing the corresponding (or even identical) interpreting functionality with respect to said syntax.

The resulting agnosticism regarding environment, only requiring the software function ES to support certain predetermined functionality, enables a scale-down of the interpreting software function ES, so that it can run on edge computing devices ECD with very limited local hardware resources. On the other hand, the number of such small edge computing devices ECD can be very large, each running such a scaled-down interpreting software function ES.

At the same time, the system 100 allows for massive scale-up, by running many instances of the interpreting software function ES on different devices in parallel. In particular, the system 100 can be scaled up to run said interpreting software function ES in many copies on large multi-cores, clusters and clouds.

These concepts of scale-down and scale-up will now be briefly explained and exemplified.

Regarding first scale-down, the present inventor has successfully configured the interpreting software function SA so that it implements a required "kernel" software functionality, which may in turn be scaled down to run directly on small devices with limited or no operating support. By porting the interpreting software function SA to various such limited resources environments, the present system 100 can be made virtually agnostic to the hardware, operating system and communication infrastructure used, by the interpreting software function ES running on each respective edge computing device ECD implementing a predefined minimum such kernel software functionality. Hence, each such piece of interpreting software function ECD can run completely stand-alone on a respective supported device or computer, forming an edge computing device ECD according to the present invention.

For some types of hardware, the present inventor has managed to design such a kernel software functionality so that is does not require operating system support, but can run on bare metal. In fact, it has turned out that the smallest possible configuration of a kernel-only system K requires less than 100K RAM and only 200K DRAM.

The kernel software functionality may be comprised as a part of the interpreting software function ES. For instance, the kernel software functionality may provide required interpretation functionality for a well-defined core part of said query language, including syntax parsing, while the rest of the software function ES, including non-required functions and similar, may add higher-level functionality.

In general, since different ones of said edge computing devices ECD may comprise different hardware configurations, the interpretation software function ES may be specifically adapted to the respective hardware configuration of each type of said different edge computing devices ECD, whereas said syntax may be identical for each of said different edge computing devices ECD.

In some embodiments, as illustrated in FIG. 1, designed to offer tight integration of the interpreting software function ES with other (system 100 external) software running on the same edge computing device ECD, the interpreting software function ES may run as an embedded engine inside other embedding software systems ESS.

Regarding then scale-up, we turn to FIG. 2 in which it is illustrated how very large numbers of such scaled-down edge computing devices ECD may be interconnected to form one single, distributed system 100, encompassing many different edge computing devices ECD and central servers CS.

To achieve this, each edge computing device ECD is managed by a particular central server CS, that may itself run as a cloud service over network NW.

As mentioned above, the interpreting software function ES may be designed with a necessary kernel functionality, including computer code query syntax interpretation and interface IF communication support. For very limited hardware environments, only this kernel may constitute the entire interpreting software function ES. Then, various non-necessary add-on functionality can be added, depending on the hardware limitations of the edge computing device ECD on which the software function ES is to execute and depending on the general system 100 configuration.

In some embodiments, each sensor S and/or edge computing device ECD is referable, according to the above mentioned syntax, using a global namespace or set of properties. For instance, each edge computing device ECD may be allotted a unique number or name, or a unique network NW address may be used as a unique identifier for each edge computing device ECD. Each sensor S of an edge computing device ECD may similarly be addressable using the same or a different identification standard. A simple example of such a name standard is "[ECD_NO]. [SENSOR_NO]". Preferably, sensors of identical type may be denoted using the same sub name according to said name standard.

In the example shown in FIG. 2, a system 100 globally-unique identity of each edge computing device ECD is registered with a respective central server CS running on some server in turn connected to the network NW; in a container or a PC; or even as a separate process on the same computer as the computer on which the edge computing device ECD interpreting software function ES executes. In the latter case, the central server CS and the edge computing device ECD actually run on the same hardware, but are logically and functionally separated. Each central server CS may serve several edge computing devices ECD, to achieve said tree structure with respect to data flow in the system 100.

In FIG. 2, there are two central servers CS running in the network NW, and four different edge computing devices ECD are registered.

The system may further in general comprise a central namespace server NS, which may be arranged with a database DB in turn comprising information defining names for each of said edge computing devices ECD. The database DB may be comprised in or connected to the namespace server NS.

The database DB may comprise information regarding network address locations for each of said edge computing devices ECD. The database DB may further comprise metadata information regarding individual edge computing devices ECD, for instance concerning what types of sensors S are available at each such edge computing device ECD, what type and/or version of the interpreting software function ES is executed on each edge computing device ECD, numerical properties used when each edge computing device ECD delivers measurement values (such as what units are used), and so forth. This metadata may then be used to determine parameter values to use in the below-described query preprocessing performed by certain edge computing devices ECD.

In general, the namespace server NS may in itself be a central server CS of the above-described type, having additional namespace information processing functionality and arranged to serve system 100 actors with namespace-related information services and requests.

All edge computing devices ECD are interconnected by network NW via said central servers CS and, if used, at least one such namespace server NS.

As mentioned, different instances of the interpreting software function ES running on different computers can communicate with central servers CS running on the same or some other computer. Each edge computing device ECD communicates with the central server CS where it is registered. The serving central server CS in question keeps some metadata about each edge computing device ECD which it serves, and can forward data and streams to other central servers CS, such as for distribution to edge computing devices ECD served by such other central servers CS.

In general, all connected devices, and in particular the edge computing devices ECD, run independently from each other. In particular, an edge computing device ECD is not required to be continuously connected with its central server CS, as long as the edge computing device ECD in question is registered with the central server CS in question. The actual digital communication of object streams between the edge computing device ECD and the central server CS in question is started and finished only when so required. When there is no active communication going on the edge clients run autonomously.

This functionality is implemented as a part of the digital communication interface IF, and decreases network NW traffic to a minimum, allowing for massive scalability. Of course, heartbeats and similar keep-alive signals can be sent between devices to keep a registered connection active. However, even this type of periodic communication is not necessary, since an edge computing device ECD which is not online will simply not respond to queries posed to it.

Hence, the system 100 comprises a set of interconnected peer devices, in turn comprising a plurality of devices selected from the following list:

The interpreting software function ES running as an embedded piece of software on some network NW connected device;

A dedicated edge computing device ECD running the interpreting software function ES;

A central server CS; and

A namespace server NS.

In practice the system 100 may comprise a massive number of such interconnected peer devices, in particular very many edge computing devices ECD. It is therefore desirable to be able to scale out the numbers of peers to handle extremely large numbers of edge computing devices ECD, from tens of thousands up to billions. This is handled by scaling out the number of edge computing devices ECD registered in each central server CS to thousands of edge computing devices ECD registered with each central server CS, and by defining a hierarchy of several hierarchy levels as described above.

Figure 3:
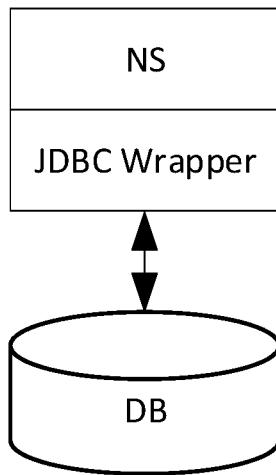
FIG. 3 is an overview of a nameserver database configuration.

The system 100 of such interconnected peers should persist even when parts of the system 100 go down. To this end, the database DB of the nameserver NS may be a wrapped database, such as a wrapped relational database, as exemplified by FIG. 3 using a per se conventional JDBC (Java DataBase Connectivity) wrapper.

In this particular example, the wrapper may be a plug-in to the interpreting software function ES that enables access to any relational database using a standard database interface, such as the JDBC interface. The database DB may hold the identifiers of all peers in the system 100, along with other metadata such as what kind of equipment is accessible through each edge computing device ECD, what kind of sensors S they access, and so forth.

It should be noted that it is also possible to implement a namespace server NS of the present type without a database backend, and in this case it is also possible for such a namespace server to persist its database. However, in order to scale to millions of interconnected peers in the system 100, it is preferred to use a wrapped database DB as described.

It is further understood that the namespace server NS and/or its database DB may be implemented as a defined server functionality executing in a distributed hardware environment.

As mentioned above, the central servers CS and the namespace server(s) NS can run on many different kinds of hardware configurations, and also in different software environments. In a simple case, they can each run on a regular PC. In more scalable configurations, each central server SC can run in a separate container (such as Docker, see www.docker.com) and the namespace server NS, along with the relational database DB, can run on a dedicated cluster.

With such a scale-out, if the number of edge computing devices ECD registered with each central server CS is 1000 and with two levels of central servers CS, up to about 109 peers can be handled. The database DB will not be a bottleneck in such a configuration, as a limited amount of metadata per peer could be stored there.

In general, the interpreting software function SA provides general data analytics and inference capabilities to the edge computing device ECD on which it is running. This functionality may generally be implemented in the same manner on different ported versions of the interpreting software function SA, so that the interpreting software function SA with respect to these functions is independent from the particular hardware/software environment in which it executes. In general, the functionality of the interpreting software function SA described herein is implemented in a way making it agnostic to hardware, operating system and communication infrastructure of the device on which it runs. In an exemplifying embodiment, the kernel of the interpreting software function ES may be written in the computer language C99.

Figure 4A:
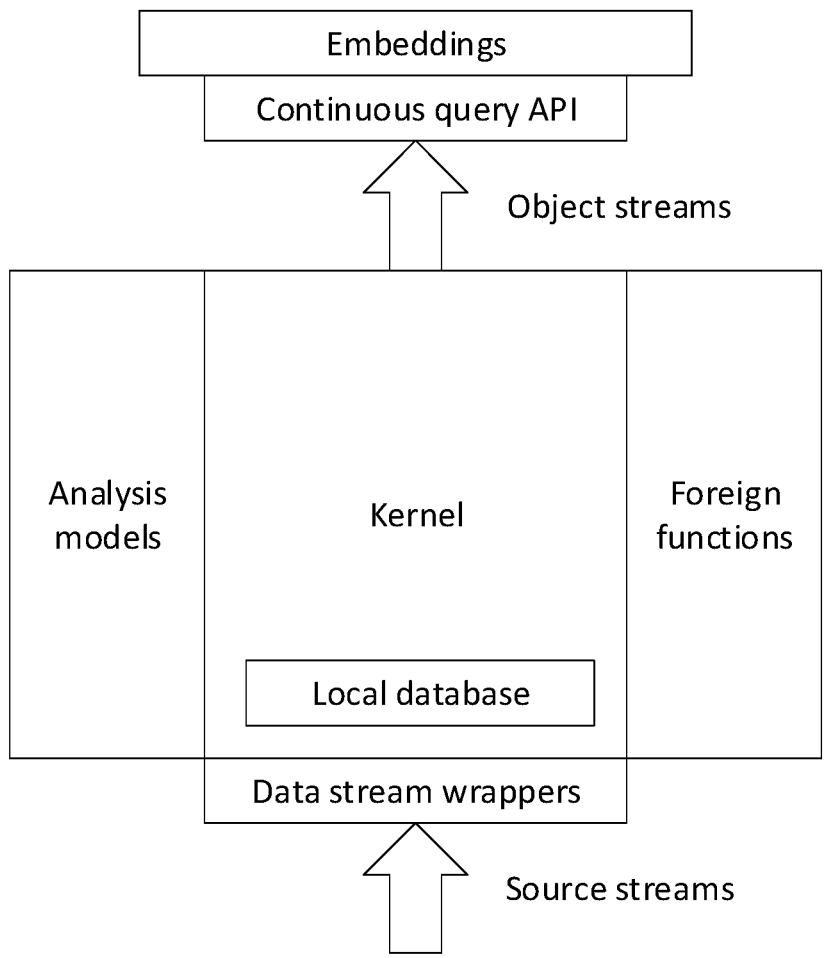
FIG. 4a is a first overview of an architecture of an interpreting software function.

FIG. 4a illustrates the main components of such an interpreting software function ES.

The core of the interpreting software function SC is the above-mentioned kernel. It provides the generic capabilities needed for real-time data stream analytics. In contains a computational engine, a data stream processor, and an inference engine. It may also comprise a main memory local database EDB (see FIG. 1), which may be an object-oriented database and may further be comprised in the memory M of the edge computing device ECD in question. Using such a locally provided database, and in particular an object-oriented database, in the edge computing device ECD, enables the use of a powerful query processor and optimizer where, for instance, analysis models and edge computing device ECD metadata may be stored and managed.

Furthermore, object-oriented data models describing metadata properties of the edge computing device ECD in question (such as information regarding the type or properties of edge computing device ECD sensors S, measurement units used the by edge computing device ECD, edge computing device ECD hardware specification or properties, and so forth) enable the requesting from an edge computing device ECD regarding information about edge computing device ECD properties, conversions of names and measurements, and so forth (so called "mediation"). Such requests can be made using said query language, and result in that the response to such a query language query depends on particular metadata information stored in the queried edge computing device ECD, or even in other edge computing devices ECD subqueried in a query cascade of the general type described herein.

The kernel comprises said data stream interpretation functionality. In exemplifying embodiments, the kernel is tightly integrated with an interpreter for digital data streams called SLOG (Streamed LOGic), and also with an interpreter for an extended subset of CommonLisp called aLisp (building on the conventional computer programming language family Lisp). In fact, the present inventor has discovered that building at least the kernel part of the interpreting software function ES in a computer programming language which is recursive and using functional notation, such as a Lisp language, provides a very efficient processing of the type of continuous queries processed by the present system 100 as described herein.

The upwards-facing arrows of FIG. 4a indicate data streams. One or several sensors S of the edge computing device ECD in question and/or the respective interpreting software function ES of one or several other edge computing devices ECD produce incoming source data streams that are injected into the kernel shown in FIG. 4a, which in turn transforms these incoming digital data streams into one or several new digital object streams for output from the edge computing device ECD in question.

Such a source data stream may be implemented as an access for the kernel to a raw sensor S interface on the edge computing device ECD on which the interpreting software function ES is running. A source stream can also be a data stream produced by a respective interpreting software function ES running on another connected edge computing device ECD, received via network NW, such as using the TCP communication protocol. For instance, such a source stream may be communicated in response to a continuous query posed by the interpreting software function ES receiving and consuming the source stream in question.

Analogously, the resulting object data streams may be sent to other central servers CS and edge computing devices ECD using the communication infrastructure (such as TCP) offered by network NW. This way, very large distributed systems 100 of peers of the present type can be configured, in which such peers produce object data streams for consumption by other peers as source data streams. On edge computing devices ECD, object stream data elements of calculated or received object data streams can be sent directly to actuators A mounted on the edge computing device ECD in question, and this way activate actuation of the actuator A in question.

In general, the system 100 and methods described herein are specifically designed for simple and interactive development and deployment of applications that process and analyse real-time streams of data in distributed and mobile environments, allowing streams that are produced by sensors S on edge computing devices ECD to be analysed, processed and aggregated online, in real-time and interactively.

An edge computing device can be, for instance, an Android unit, a PC desktop computer, a Raspberry Pi, or MCUs (Micro Controller unit) like MangOH Red or ARM M4. As described above, the interpreting software function ES, and in particular said kernel, can be designed to have a very small footprint (the present inventor has managed to slim the fully functional interpreting software function in test environments to total memory M footprints ranging from about 100 kB to about 5 MB, depending on configuration), and to be essentially hardware and operating system agnostic, as well as fully independent of any third party software.

The combination in each of the edge computing devices ECD of a respective main-memory M database EDB, a software-implemented computational engine, a software-implemented data stream processor, and a software-implemented inference engine allows the use of edge analytics directly on the edge computing devices ECD. This is in contrast to many conventional approaches, in which all measurement data is first uploaded from edge devices to a central server, and in which the central server then performs all the data processing centrally. The present approach instead allows for drastic data reduction by processing the data streams already in the edge computing devices ECD. This way, only aggregated analyses, such as population analyses, over collections of connected edge computing devices ECD need to be made centrally or semi-centrally, such as on different aggregation levels in said tree structure data flow.

This way, the interpreting software function ES has a filtering capability, in other words it is arranged to filter an available source data stream to produce an output object data stream containing less data per time unit than the source data stream.

In some configurations, the interpreting software function ES can also assume a data stream server role, either when running on an edge computing device ECD or on a central server CS. In such a data stream server role, the interpreting software function ES is arranged to collect data from one or several connected edge computing devices ECS and to combine and forward the combined/processed data as an object data stream to other peers. For example, whenever the analysis model in some edge computing device ECD detects strong vibrations, by performing a computation over the latest readings from its accelerometer sensor, an object data stream containing the frequency spectrum of the vibrations along with the geographical position of the edge computing device ECD in question may be transmitted to a stream server running on a central server CS, which in turn is configured to receive similar information from a plurality of different connected edge computing devices ECD. If the stream server receives many such streams at the same time, from edge computing devices ECD in geographical positions close to each other, it may indicate an earthquake. The stream server may furthermore forward the received and possibly processed data to other connected system 100 peers or to an external system, such as for permanent central storage or batch analysis.

As mentioned above, the interpreting software function ES is arranged to interpret computer code formatted according to a well-defined query language syntax. Such a query language syntax can be selected to provide analysis of an available source data stream interactively and on a high and user-oriented level.

In particular, the query language may be a high-level object-oriented query language. The syntax may allow for different side effect free conditional logic-depending execution paths (such as "select-from-where" clauses), that are then interpreted and executed by said interpreting software function. The queries may be at least partly declarative in the sense that their interpretation and execution only result in searches of, and the performance of any calculations over, the database inside each respective edge computing device ECD, without updating these databases inside the edge computing devices ECD or changing the state of the device. However, it is preferred that the queries are at least partly non-declarative (see below).

In some embodiments, the query language may be designed to allow queries to have side effects such as updating databases, signalling actuators that change the state of the device, or sending messages to other edge computing devices ECD when such queries are loaded into the memory M of the edge computing device ECD on which the interpreting software function ES runs, and executed by the interpreting software function ES interpreting the query in question. In other words, when the interpreting software function ES executes on the edge computing device ECD in question and then interprets the loaded computer code, the programming embodied in the computer code, which may comprise the handling of states and/or side effects, is executed as a result of said interpretation.

Another term for a language being "declarative" is that it is "non-procedural". Hence, the present query language is preferably not non-procedural, but rather at least partly procedural. Providing the query language as a declarative/non-procedural query language allows users to specify, in an intuitive manner, desired results in terms of output data, rather than exactly what the edge computing device ECD should do in terms of calculations to achieve the desired results. However, at the same time defining the query language so that it has certain non-declarative/procedural elements allows for queries to have side-effects and include stateful functions. When processing streaming data, such procedural/non-declarative elements of the query language provides the possibility to extract information from state-changing sensors.

The following is an example of a declaratively defined object-oriented query that returns a stream of objects for a given stream of sensors readings from an accelerometer sensor S:

select stream of absolute (shakes) from vector of number shakes,
where shakes from accelerometer ( )

The query receives a set of acceleration readings as objects being 3D vectors shakes from a sensor accessed through the function accelerometer. It returns a stream of single numbers being the absolute values of the shakes objects. Here the function accelerometer ( ) is stateful because it returns a new value every time it is called. The interpreting software function ES may in general be aware of the fact that queries contain calls to stateful functions, and be arranged to take this into consideration when parsing and interpreting queries. This provides for more efficient processing of queries of said type. Whenever the accelerometer emits new vectors, the query computes and emits its absolute value. Functions can also be expressed by queries. For example, the absolute function may be defined as create function absolute (Vector of Number v)→Number
as select sqrt (sum (v.^2))

The query select sqrt (sum (v.^2)) takes a numeric vector object v as parameter and returns its absolute value.

In some embodiments, the computer code is formatted according to an object-oriented query language, allowing users to specify computations, filters and transformations over data streams at each connected edge computing device ECD. In other words, the present query language may be an object-oriented query language.

An object-oriented query language is a language supporting queries where variables are bound to objects of any kind (e.g. numbers, vectors, matrices, strings, records, key-value repositories, and so forth). Objects can even represent entire edge computing devices ECD making it possible to make queries over possibly large collections of edge computing devices ECD and edge computing device ECD internal databases EDB. In the code examples above, the variables shakes and v are bound to streams and vectors, respectively. This may be contrasted to relational query languages such as SQL, wherein variables in queries (SQL's select-statement) must be bound only to rows in tables. Such object-oriented query language may allow filtering and transforming data objects of any kind.

The present query language may in addition contain procedural (stateful) functions where the database EDB or the state of the edge computing device ECD itself is updated by calling the function. The query processor of the interpreting software function ES then has to take into account that the order in which stateful functions inside the query are called is significant, since it will change the result. For example, database EDB accesses after a state change will produce different results than before.

It is noted that there exist procedural statements in, for instance, SQL, allowing manipulation of states and variables in the said sense. However, in SQL queries (i.e. select-fromwhere statements) this is not allowed. Hence, one important difference between the present query language and for instance SQL is that the present query language allows for use of variables and/or stateful functions in queries that are defined using the query language and said syntax.

The result of an object-oriented query may also be a stream of objects. Such computations and filters over real-time streaming data may be defined, for instance using such an object-oriented query language, as mathematical formulas and expressions, herein denoted "stream models". Such a stream model is a set of definitions of mathematical functions, filters, and other expressions, defined over a stream of data such as measurements. Using an object-oriented query language, the models can be specified on a very high level without the user needing a deep programming knowledge. Instead of writing detailed programs expressing how to execute the models, it is instead possible to simply specify in the stream model what to do in terms of the final end result, and how that end result depends on any intermediate calculation results. The user needs not worry about details on how to efficiently implement algorithms that integrate large numbers of edge computing devices ECD and central servers CS to achieve a common goal in terms of data collection and processing.

In some embodiments, the stream of objects in a function returning a stream is stateful, e.g. by originating in a sensor S on an edge computing device ECD or the environment, such as is the case for accelerometer above. The query processor of the interpreting software function ES may therefore be arranged to consider side effects of such stateful stream functions when optimizing and executing the query. The order of the objects of the object data stream produced by such a query may furthermore also be significant and a function using or used by such a query therefore becomes stateful.

In some embodiments, the computer code may be provided to the edge computing device ECD, via the interface IF, as plaintext (as opposed to compiled/objective/machine code). In some embodiments, however, the computer code may be precompiled and be provided in non-plaintext, compiled format to the edge computing device ECD (the compilation may then be performed in a central server CS or somewhere else where more CPU/memory resources are available than on the edge computing device ECD in question). In the latter case, it is possible to provide the interpreting software function ES in a simpler version, configured to read and interpret precompiled computer code. This will result in a simpler interpreting software function ES. However, it is preferred that at least one, such as at least several, substantially all or possibly even all edge computing devices ECD still feature a respective interpreting software function ES which is arranged to interpret plaintext computer code of said syntax. Whether or not each particular edge computing device ECD accepts plaintext computer code may be specified in the metadata in the database DB for the edge computing device ECD or edge computing device ECD type in question, and a central server CS may be arranged to check this metadata setting and to selectively compile or not compile the computer code distributed to each edge computing device ECD based on such metadata setting.

As mentioned above, the object data stream may be a stream of data objects, such as a stream of data objects wherein each data object represents the values of a respective tensor, which in turn may represent, for instance, a current physical state of a particular local environment sensed using one or several sensors S.

However, the data objects can be any type of data object, ranging from simple alphanumeric numeric information such as measurement values (INTs, LONGs, CHARs, etc.), over more complex data structures according to a predetermined syntax (ARRAYs, LISTS, BAGS, RECORDs, etc.), to complex data objects or pointers, such as references to data objects or callback functions. Preferably, such data structure definitions form part of the syntax of the query language.

In some embodiments, each of said objects is processed by a callback function being a part of said interface IF and being executed in a defined central server CS or on the edge computing device ECD. The object in question may comprise a pointer, address or other identification of said callback function.

In some embodiments, the object data stream is an endless stream of objects, calculated by the interpreting software function ES of the edge computing device ECD continuously or intermittently over time and delivered to a querying recipient via interface IF. The stream of objects may be communicated via said digital communication interface IF upon becoming available after said calculation or batchwise, as the case may be. Being an endless stream of objects, said calculation and delivery may be ongoing until something stops it, such as a request to stop the delivery of the result of the query or that the edge computing device ECD in question goes offline or breaks. Hence, as used herein, the term "endless stream" is intended to mean a stream of data objects that has no defined end point at the time of querying, but instead is arranged to produce results that keep on being generated until some circumstance arises that causes the generation to stop. In other words, such circumstance may be at least partly unpredictable at the time of initiation of the endless stream, requiring some kind of finishing mechanism to be activated to stop the endless stream.

In some embodiments, said syntax allows for different conditional logic-depending execution paths, interpreted and executed by said interpreting software function ES. For instance, a query defined in terms of said computer code may comprise IF-statements, WHILE loops and similar.

Hence, queries defined using said query language may be defined to continuously result in computations or filtering over measurements in a source data stream available at an edge computing device ECD receiving the query in question, and to deliver as a result an endless data stream. Herein, such a query is denoted a "continuous query". In some embodiments, the present system 100, using a query language allowing such continuous queries, allows users to interactively specify continuous queries for continuously analysing measurements flowing through edge computing devices ECD and central servers CS in real-time. As mentioned, the result of a continuous query is a real-time (endless) object stream of processed/filtered measurements.

A continuous query, in contrast to a non-continuous query, will as a response deliver a data stream that is not only dependent on the state of the queried database at the time of posing the query, but that may also change over time as the internal state of the queried database changes. This is, for instance, true for a continuous query posed to an edge computing device ECD, having an internal database EDB internal state changes of which may affect the values of a data stream produced in response to said continuous query.

As an example to illustrate this aspect, a continuous query may be defined to return a stream of the position vectors of a particular edge computing device EDC, as measured every second at all times when the device EDC in question is sufficiently close to a given geo-position. In this example, the calculation involving a comparison between a measured geo-location to a predetermined geo-position is performed locally on the edge computing device EDC, which then sends the processed data as a continuous data stream to a querying peer.

Both stream models and user data may be stored in each individual edge computing device ECD in its object-oriented in-memory database EDB, and similarly on each central server CS (such a central server may run the interpreting software function ES, and may also comprise such an object-oriented database EDB used by the interpreting software function ES running on the central server CS). Since data stream processing at each edge computing device ECD normally involves matching in real-time fast flowing stream objects against data in the local database EDB, the fact that the database EDB is an object-oriented database makes it possible to design the edge computing device ECD to be computationally fast in relation to its CPU power due to efficient data representation and processing. Another way of viewing this is that the object-orientation aspect of the database EDB makes it specifically adapted for efficient handling of the objects constituting the data streams the primary task of the interpretation software function ES is to process. As an example, to determine that the frequency spectrum of a measured vibration may later destroy a sensing edge computing device ECD due to material fatigue, the frequencies measured by a vibration sensor S on the edge computing device ECD in question may be matched against a local object-oriented database EDB at the edge computing device EDC of resonance frequencies of the edge computing device EDB itself.

One important aspect of the interpreting software function ES is that it may be designed to allow the combination of object streams from several different edge computing devices ECD. In other words, the interpreting software function ES may support the interpretation of "fusion queries", that can be defined using said query language and are defined to reference several different available source streams. The interpreting software function ES is then arranged to, when interpreting such a fusion query, computationally combine said available object streams to produce a particular output object stream. An example of such a fusion query is a continuous query designed so that it, when interpreted on a particular edge computing device ECD, causes the latter to observe when several other edge computing devices EDC in a particular geographical area detect strong vibrations at the same time. A user is then alerted when this fusion query produces a predetermined result, perhaps together with a visualization in real-time of the maximum or average magnitude of the observed vibrations. The user can then interactively send new queries on-the-fly to affected edge computation devices ECD to find out details of their causes.

The query language, and in particular its syntax, may allow a query to refer to information received by a first (requesting) edge computing device 110 (see FIG. 2) from a second (responding) edge computing device 120. Such reference makes use of the above-described global namespace, and may in particular use the services of the namespace server NS to find the responding edge computing device 120 on the network NW. The contact may then be mediated by one or several intermediate central servers CS between the requesting and responding edge computing device ECD. To achieve this, it is preferred that the query language is an object-oriented query language, as described above, according to which variables can be bound to edge computing device ECD objects and where subqueries to edge computing device ECD objects can be expressed.

Hence, a first query received by the first edge computing device 110 may include a reference to the second edge computing device 120. When interpreting the first query, the interpreting software function ES running on the first edge computing device 110 will then, as a result of the reference to the second edge computing device 120, pose a second query to the second edge computing device 120, requesting the particular information specified by the first query. The interpreting software function running on the second edge computing device 120 will then, when interpreting the second query, return an object stream to the first edge computing device 110, which will be used by the interpreting software function ES running on the first edge computing device 110 to calculate a result to the first query, in the form of an object stream returned to the entity posing the first query to the first edge computing device 110. In other words, the interpreting software function executing on the first edge computing device 110 may be arranged to cause the first edge computing device 110 to query said information from the second edge computing device 120, as a consequence of the computer code-defined query referring to the second edge computing device 120.

Instead of, or in addition to, the second edge computing device 120, the reference in the query posed to the first edge computing device 110 may be to a particular sensor S comprised in the second edge computing device 120, such as sensor S also being identified and reachable via said global namespace.

The query posed to the first edge computing device 110 may be a continuous query, as may be the case for the query posed to the second edge computing device 120 as a result of the former query. However, these two queries may be either continuous or non-continuous independently of each other, depending on the actual information sought and how the queries are defined.

Furthermore, the system 100 may further comprise a third edge computing device 130, which may but does not have to be of the same type as the second edge computing device 120, in terms of what type of sensors S are available in the device and so forth.

The interpreting software function ES running on the first edge computing device 110 may then be arranged to, as a consequence of a namespace referral in the query posed to the first edge computing device 110, pose a respective query both to the second edge computing device 120 and to the third edge computing device 130. The interpreting software function ES running on the third edge computing device 130 may then be arranged to, in response to the query being received from the first edge computing device 110, generate a resulting object stream and to communicate this object stream to the first edge computing device 110 via the digital interface IF of the first edge computing device 110.

Then, the interpreting software function ES running on the first edge computing device 110 may be arranged to perform its calculation defined in the query posed to the first edge computing device 110 using both the object stream received from the second edge computing device 120 and the object stream received from the third edge computing device 130.

In general, a respective result of said queries made by the first edge computing device 110 may comprise an endless respective stream of objects received by the first edge computing device 110 from the second 120 or third 130 edge computing devices, calculated by the second 120 or third 130 edge computing device continuously or intermittently over time and communicated to the first edge computing device 110 via the digital communication interface IF of the first edge computing device 110.

The interpreting software function ES executing on the first edge computing device 110 is, in turn, arranged to cause the first edge computing device 110 to pose the query in question as a consequence of the query received by the first edge computing device 110.

It is noted that the first query may comprise, as a part of its computer code definition, the second and third queries, or computer code making it possible for the interpreting software function ES executing on the first edge computing device 110 to formulate the second and third queries for communication to the second and third edge computing devices 120, 130. Then, the respective interpreting software function executing on the second and third edge computing devices 120, 130 will interpret the second and third computer code-defined query, respectively, and as a result deliver the respective data stream to the first edge computing device 110. Then, the second and/or third query may in turn be defined in a way referring to a fourth and subsequent edge computing device ECS and/or sensor in a corresponding manner, depending on the definition of the first query. Since the query language may support complex logic or contain stateful functions as discussed above, such subsequent queries may be dynamically defined on each interpreting edge computing device ECS, for instance based on parameters describing a local network NW neighbourhood to the edge computing device ECS in question or other updated parameter data. This way, a single query posed to the first edge computing device 110 can give rise to an automatically developing cascade of queries, potentially involving massive numbers of other edge computing devices ECS collecting, processing and communication streams of data that eventually reach the first edge computing device 110 for processing. This also provides a very powerful way for a user to automatically deploy distributed logic to a complex system of edge computing devices ECS by basically defining the desired result, using necessary specificity, in the first query. For instance, the first query may define any other edge computing devices ECD to involve based on parameter data defined in the first query, such as particular geographic areas of interest and/or particular types of sensors S to be used. Then, the interpretation of the query may perform the actual selection of secondary edge computing devices ECD based on such parameter values and current conditions.

These mechanisms also allow the local computational power of each edge computation device ECD may be maximally exploited in a truly distributed calculation, while still providing a robust, flexible and user-friendly system 100 which can be tailored and updated on-the-fly and in real-time. For instance, in case a user wishes to see what impact an updated query has, the updated query can simply be pushed to the first edge computing device 110, which will immediately start to interpret the updated query, including updated queries to the second 120 and third 130 edge computing devices and so on, as the case may be, ultimately producing an updated object stream back to the querying user. This updated object stream will then generally be available more or less immediately, or at least sufficiently fast so as to allow the user to perform such deployment as a part of an iterative development function, where the updated object stream constitutes feedback to the design process, in turn comprising several iteratively amended first query definitions.

With a similar goal, each edge computing device ECD may be arranged to discard at least some, preferably substantially all, or even all, measurement data measured by the sensor(s) S of the edge computing device ECD in question, instead of storing the measurement data in its memory M, after having communicated such measurement data and/or a piece of information calculated based on the measurement data over the digital communication interface IF, such as based on an interpreted query. In other words, each edge computing device ECD may perform the measurement, perform query-defined calculations based on the measurement data and send the measurement data and/or the result of said calculations to a requesting party and thereafter purge the measurement data from the memory M. This way, an efficient data flow can be achieved throughout the system 100, without clogging the individual memories M of individual edge computing devices ECD.

As mentioned, a query of the type described herein may refer to a particular edge computing device ECD and/or to a particular sensor S of such an edge computing device ECD. However, the interpretation software function ES of a particular edge computing device ECD may also refer to a particular object stream being produced within another edge computer device ECD, such as in the form of a result from an internal calculation or, more commonly, a stream of preprocessed or raw measurement data from a particular sensor S comprised in the other edge computing device ECD. In particular, the interpreting software function ES of the first edge computing device 110 may be arranged to accept a subscription request from an alpha edge computing device 140 for an object stream resulting from an individual query processed by the interpreting software function ES of the first edge computing device 110, in a context where the alpha edge computing device 140 did not pose the query in question to the first edge computing device 110. For instance, the first edge computing device 110 may calculate an endless stream of analysed vibration measurements from various other edge computer devices ECD, as a result of a particular query defined within the first edge computing device 110 or posed to the first edge computing device 110 from some other peer entity. Then, the alpha edge computing device 140 may post a subscription to the resulting endless stream by requesting such a subscription via the interface IF of the first edge computing device 110. Such a subscription may be continuous or time-limited, and may of course be cancelled by the alpha edge computing device 140 at any time.

As described above, each edge computing device ECD has a relationship to a particular central server CS, and the two communicate. It is generally preferred that this relationship is a client-server type relationship, wherein the edge computing device ECD assumes a client role and the central server CS assumes a server role. This is advantageous from a security point of view, and also for being able to handle edge computing devices with limited capabilities or resources.

Hence, each of said edge computing devices ECD has a client role in relation to a particular respective one of said central servers CS. That the edge computing device ECD has a client role means, in this context, that before an edge computing device ECD and a central server CS have established a communication connection, the central server CS cannot connect to such an edge computing device ECD. This means that the central server CS in question is not allowed to contact the edge computing device ECD. In other words, the central server CS comprises no functionality, or is not allowed access to necessary credentials, for establishing a communication link with the edge computing device ECD on the initiative of the central server CS, at least not a communication link useful for sending or receiving computer code of the type described herein. On the other hand, an edge computing device ECD can establish communication contact with a serving central server CS, such as using credentials (login credentials, PKI key credentials, or similar) Hence, before digital communication contact has been established between the edge computing device ECD and the central server CS, it is always the edge computing device ECD that initiates communication with its central server CS, and never the other way around.

After such digital communication has been established between the edge computing device ECD and its serving central server CS to achieve said client/server relationship, both the edge computing device ECD and the central server CS can communicate with its counterpart in the client/server relationship, using digital communication protocols that may be conventional per se.

As discussed above, it is preferred that all communication between individual edge computing devices ECD (such as communication with other edge computing devices ECD and the below-described interactive GUI) takes place via at least one central server CS, whereby no direct contact is allowed between individual edge computing devices ECD. In some cases, a central server CS serving an edge computing device ECD needs to communicate with one or more intermediary central servers CS, such as higher-level central servers CS in said tree structure, in order to reach the central server CS serving another edge computing device ECD.

Using such network topology, a secure system is achieved, in which there is also no need to provide edge computing devices ECD with server functionality, saving valuable storage space.

As described above, in some embodiments the interpreting software function ES running on the first edge computing device 110 is arranged to pose a query to the second edge computing device 120, whereby the interpreting software function ES running on the second edge computing device 120 is arranged to, in response thereto, generate a stream of data objects and to communicate this stream to the first edge computing device 110 via the digital communication interface IF of the first edge computing device 110. Then, the interpreting software function of the first edge computing device 110 is arranged to perform a calculation using said received stream of data to calculate a particular result.

In such a case, the interpreting software function ES of the first edge computing device 110 may be arranged to perform a preprocessing of the stream of data objects received from the second edge computing device 120, which preprocessing then results in a preprocessed stream of data objects which then forms the stream that is finally used in said calculation performed by the first edge computing device 110. In particular, this preprocessing operation may be arranged to transform the received stream of data objects so that the data contained therein adheres to a predefined global data ontology.

In general, such a preprocessing may comprise at least one of a mapping of a name standard, said name standard being local to an edge computing device ECD, to a global name standard, such as a system 100 global name standard; a measurement unit conversion; a defined data format conversion; and the application of the results of a measurement data calibration to a measurement value.

One simple example is the case in which the second edge computing device 120 internally uses a different measurement unit than what is a correct measurement unit according to said global data ontology. However, the preprocessing may also be more elaborate, such as statistically treating measurement data received in an object stream from the second edge computing device 120 so that it is stripped from statistical outliers, and so forth. In other examples, the binary data representation of the received data may be transformed to fit the global data ontology. For instance, signed four-byte integer values may be transformed to unsigned four-byte integer values.

The term "data ontology", as it is used herein, refers to a system of definitions and/or rules with respect to measured data, specifying how measurement data is to be represented in terms of measurement units, statistical and calibration consideration standards, binary representation, etc.

For instance, fusion queries (discussed above) require the integrated data streams to be comparable even though the involved object streams may represent the same or similar data in different ways. For example, the second edge computing device 120 may represent temperature in Fahrenheit while the third edge computing device 130 uses Celsius. To be able to combine such heterogeneous data streams from different edge computing devices ECD, the interpreting software function ES, and in particular the interpreting software function ES executing on the first edge computer device 110, may be arranged to allow mediator models to be defined as queries and functions that harmonize arriving such heterogeneous object streams by transforming them to a universal model (the global data ontology). Such mediator models may be defined locally in any edge computing device ECD forming a stream server that integrate data streams from different other edge computing devices ECD. In addition to the above provided examples, such mediation may also comprise the mapping of local names of sensors S to a universally known nomenclature and calibrations of local measurements.

Hence, in the case described above, in which the first edge computing device 110 also poses a query to the third edge computing device 130, the interpreting software function of the first edge computing device 110 may be arranged to perform another preprocessing, now of the stream of data objects received from the third edge computing device 130. This other preprocessing may result, similarly to the preprocessing of the data received from the second edge computing device 120, in a preprocessed stream of data which is used in the calculation performed by the first edge computing device 110 instead of the data actually received from the third edge computing device 130. In a way corresponding to the previously described preprocessing, this preprocessing may also be arranged to transform the stream of data received from the third edge computing device 130 so that the data adheres to said global data ontology.

Each of these preprocessing activities may use defined parameter values to perform the preprocessing in question. Such parameter values may be different for different preprocessing operations, and in particular different between data received from different edge computing devices ECD. They may be of the general type discussed above, including measurement units used and so forth. Using such parameters, that may be globally or locally defined for individual edge computing devices ECD or for defined types of such edge computing devices ECD, and that may be provided by one or several central servers CS and/or stored in individual edge computing devices ECD, a common data ontology can be automatically imparted throughout the system 100 even in case the system 100 encompasses many different types of diverse edge computing devices ECD, without the user having to worry about these aspects when defining her queries.

In some embodiments, said preprocessing is performed based on metadata regarding the second edge computing device 120, or regarding a specific defined type of edge computing device ECD to which the second edge computing device 120 belongs, from which the preprocessed data stream in question is received. This metadata may then be defined via the digital communication interface IF of the first edge computing device 110. In other words, information necessary to perform the preprocessing in question, for instance said preprocessing parameters, are communicated over the digital communication interface IF of the first edge computing device 110. For instance, the first edge computing device 110 may query its central server CS for such parameters based on the global namespace identity of the second edge computing device 120, and then use received such parameters in the preprocessing of the received data stream.

In some embodiments, the digital communication interface IF of the first edge computing device 110 may comprise at least one wrapper mechanism, arranged to transform a received stream of data from an external data format to a data format internal to said query language. In other words, the second 120 and/or 130 third edge computing device delivers said data streams to the first computing device 110 using a data format (such as a defined data structure or binary representation) which is not according to said global data ontology and/or not internal to said query language. Then, the wrapper mechanism of the first edge computing device 110 may transform the received data and wrap it into a data format directly acceptable to the interpreting software function ES running on the first edge computing device 110.

That the data format is "internal" to the query language means that it is according to a data definition provided as a part of the definition of said query language and directly useful by an interpreting software function ES without further conversion.

It is understood that the corresponding mechanism can be applied when the first edge computing device 110 receives data from a system 100 external source, or when the first edge computing device 110 receives data from a source within the system 100 but not constituting an edge computing device ECD itself. As is understood, the query language may support query definitions in terms of data collected from such "external" sources. Then, a corresponding wrapper can be defined in relation to such a data source, which wrapper is arranged to transform the received data to a corresponding query language internal data representation. This principle may in particular apply to received streams of such data.

Hence, wrapper functionality of the above discussed type may be in the form of an API that enables mapping over incoming data stream objects as they arrive in order to inject them into the interpreting software function ES kernel so that the accessed data stream can be used in continuous queries defined using said query language. The wrappers themselves may be defined as query language functions that return object streams from wrapped data sources. The system 100 may comprise a library of predefined wrappers to interoperate with common data infrastructures, such as relational databases through JDBC and data processing systems through Kafka, Azure IoT Hub, or MQTT. Using the infrastructure with wrappers, new such wrappers can easily be developed and deployed on-the-fly as new needs arise.

In order to allow cooperation between the interpreting software function ES and peripheral computer code, such as computer code not being formed from said query language but being executing on the same edge computing device ECD as the interpreting software function ES, the interpreting software function ES may comprise an external Application Programming Interface (API), arranged to allow expressions in the present query language to call such external computer code and/or arranged to allow external computer code to call expressions in the query language. "External computer code", in this context, is intended to mean computer code not being part of the interpreting software function ES and not being computer code according to said query language, such as other software running on the same edge computing device hardware or other hardware in digital communication with the edge computing device ECD in question.

For instance, the system 100 may include a library of predefined query language function for performing various specific tasks such as math/stat computations, object stream filtering and transformation, signal processing, model and data management, and so forth. This library may be stored in one or several central servers CS or be bundled together with the interpreting software function ES in each or at least several edge computing devices ECD. The function library may be modular in the sense that it can be extended to cater for new user needs and that it is arranged so that users can define and deploy new user functions on-the-fly by simply pushing updated library information to concerned devices ECD.

However, existing algorithms and code libraries may be implemented in other programming languages, or for other reasons not be directly compatible with the interpreting software function ES. Such existing code can then be plugged into the system 100 as "foreign" query language functions (see FIG. 4a), using programming language specific APIs provided by the interpreting software function ES. Such foreign functions can then be transparently used in queries and expressions defined using the present query language. For example, in case the interpreting software function ES is implemented in Lisp and in case it is desired to use code in the C programming language as a part of the calculation of query results in an edge computing device ECS, such a C language specific API may be employed so that the interpreting software function ES can make function calls directly to the C language implemented code, resulting in that the corresponding C code is executed as a result of the interpreting software function ES performs interpretation and processing of a query.

As FIG. 4a illustrates, using the concepts of foreign functions and stream wrappers, the interpreting software function can be arranged to be very extensible, in the sense that many different kinds of plug-ins can be added without changing other parts of the system 100.

"Analysis models" (FIG. 4a) are models that specify transformations, filters, computations and inferences over source data streams, producing object data streams as a result. Such analysis models may be specified by a user without requiring deep programming skills or detailed knowledge about the inner workings of the interpreting software function kernel to define such models. Furthermore, such analysis models may be defined using the same object-oriented query language as used to define queries of the present type (using said syntax). Hence, an analysis model may be defined as a set of query language functions and/or continuous query definitions pushed out to the edge computing device ECD via interface IF and stored in local database EDB. Thereafter, the analysis model can be used, via an API of the interpreting software function ES running on the edge computing device ECD in question, in queries posed to the edge computing device ECD.

Still with reference to FIG. 4a, "foreign functions" are functions implemented in any conventional programming language, such as C, Lisp or Java, to implement an external algorithm, such as a numerical, statistical and/or inference algorithms. Such foreign functions can be used as plug-ins, referred to in queries of the present type defined using said query language. Using a foreign function API of the interpreting software function, such functions can be referred to and accessed directly, via query language reference, from the interpreting software function without porting or modification in any other way. Such foreign functions may be precompiled and loaded into the local memory M during installation or at a later time, such as when needed. In particular, such foreign function algorithms can be used in analysis models of the above described type to filter and transform the incoming data streams into derived object streams.

Furthermore, foreign functions can be granted access to the functionality provided by the interpreting software function ES, allowing very powerful addition of capabilities to the interpreting software function via such foreign functions, for example to access file systems, operating system calls, inference engines or complex database managers forming part of the kernel functionality. The foreign function API may also include the mapping of foreign language data structures to a query language data structure, so that data can be accessed directly without need for data transformation. For instance, a C language data structure can be directly mapped to a corresponding query language data structure, based on individual mapping definitions (comprised in said API) regarding simple and complex data types.

In order to access incoming data streams in continuous queries, data stream wrappers may be implemented as functions defined partly (as foreign functions) or completely using said query language. For example, the query language can be arranged with standard sensor interfaces for commonly used sensors S, available as a part of said interpreting software function ES. Only one such data stream wrapper needs to be implemented for each kind of incoming data stream; once implemented for a certain stream kind, all such streams can be queried using continuous queries of the present type. Such a data stream wrapper may then be defined as a continuous query returning an object data stream. Such a query may be defined in the form of a function, accepting arguments, for example to represent the identity of the stream it wraps.

A data steam wrapper needs to physically access an external data stream and convert each of its arriving data stream elements to a suitable data format for efficient and flexible processing by the interpreting software function ES. Different streams often represent their elements using different data structures, and data stream wrappers of the present type will therefore usually convert such external data representations to a format already supported by the interpreting software function ES. However, in some cases binary data representations can be lifted directly into the interpreting software function ES, without any data transformation. This can be made by mapping such a binary data representation to an internal binary data format specifically adapted to correspond to the known binary data format output by the sensor S in question.

The interpreting software function may be arranged with a built-in library of built-in data stream wrappers for common infrastructures, such as for Kafka, Azure IoT Hub, MQTT, CVS and JSON streams. In addition to this, additional wrappers may easily be downloaded, as needed, onto each edge computing device ECD and as a result form part of the interpreting software function ES effective immediately.

Normally, data streams originating from sensors S will be endless (as described above). However, data streams can also be finite in some cases. As an example, there may be a special JDBC data stream wrapper available that handles the finite result from an SQL query passed as a wrapper function parameter through JDBC to a relational database. This wrapper may then be used for persisting peer metadata in the nameserver NS.

As mentioned above and as illustrated in FIG. 4a, the interpreting software function ES may also be embeddable in a software environment present on the hardware on which the interpreting software function executes. This way, an embedding application or system may access object data streams produced through a continuous query API provided by the interpreting software function ES. The embedding application program or system may run in the same process and address space as the interpreting software function ES, such as when running an embedded interpreting software function ES on an edge computing device ECD having limited hardware resources. In another example, an interpreting software function ES running on a particular edge computing device ECD may act as a client to a central server CS running on some other computer or cluster communicated with via TCP or some other communication infrastructure. For instance, there may be such interfaces to embeddings defined for common infrastructures such as Kafka, MQTT, or Azure EventHub.

Figure 4B:
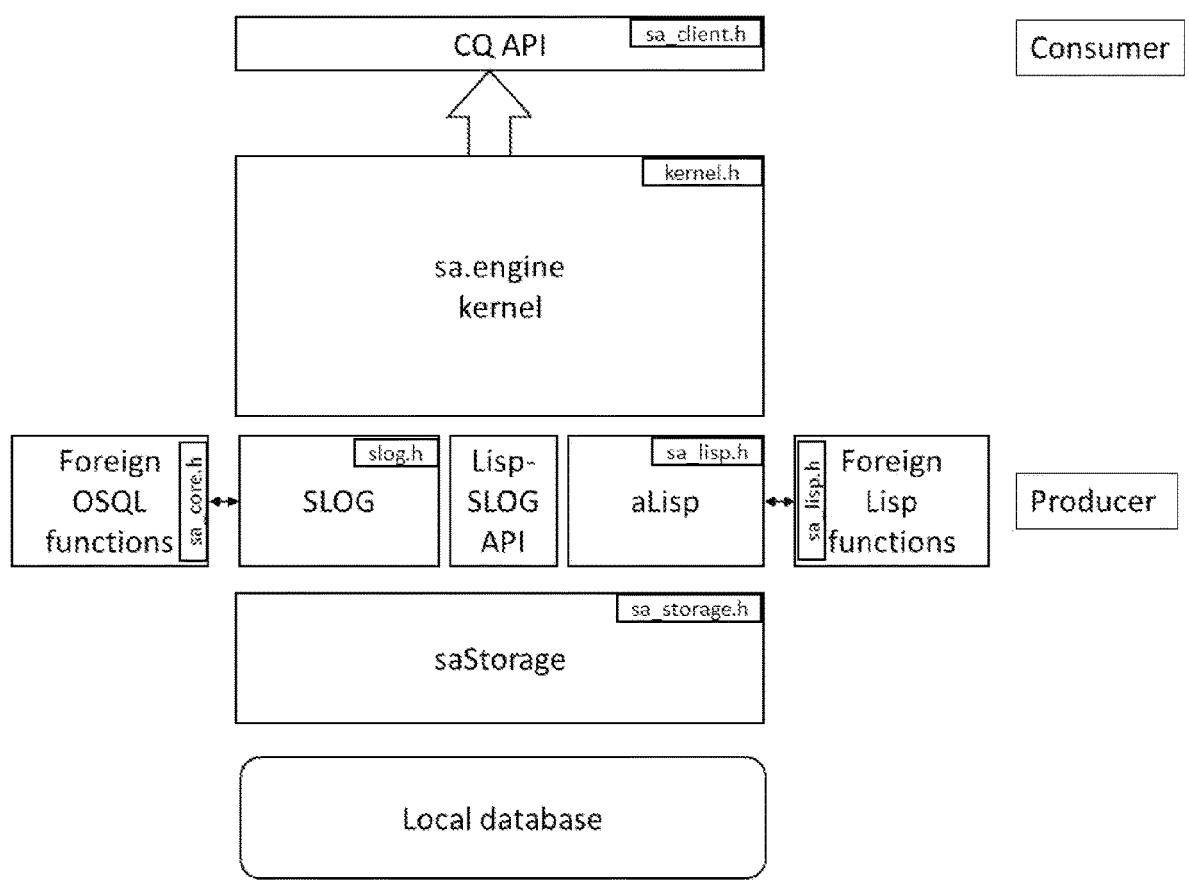
FIG. 4b is a second overview of an architecture of an interpreting software function, showing more details than FIG. 4a of core functions of said interpreting software function.

FIG. 4b illustrates a hierarchy of component parts in an example of an edge computing device ECD of the present type. Deeper layers are independent from upper layers. "Local database" is the local primary database EDB which exists in each edge computing device ECD as described above. In this database EDB, stream models and temporary data is stored. The local database EDB is managed by the subsystem denoted "saStorage" via interface "sa_storage.h".

On top of "saStorage", there are two independent interpreters ("SLOG" and "aLisp"). Module "Lisp-SLOG API" is the glue between these interpreters, making it possible to call "aLisp" from "SLOG" and vice versa.

"aLisp" is an interpreter for a subset of "CommonLisp" (a per se conventional dialect of the Lisp programming language), extended by functions required to implement the upper application layers in the edge computing device ECD, namely "sa_kernel". "CommonLisp" is a conventional, functional programming language in which all functions return different types of (finite) objects as result. The object returned from a function is stored in the primary memory EDB, which becomes a problem in case the result is too big. Note that Lisp code is data stored in the primary database EDB.

On the other hand, "SLOG" is a data stream interpreter for a language similar to programming languages such as Prolog. A "SLOG"-operator returns not an individual object, but instead the result is a handle to a stream of objects. The calling application sends a callback to the "SLOG", applying the callback to the elements of the resulting object stream. Hence, "SLOG" operators are so-called generators, in contrast to functions in "aLisp". Foreign object-oriented query language ("OSQL") functions may be implemented as foreign "SLOG" functions. A foreign "SLOG" operator (that is, a foreign object-oriented query language function) returns a stream of resulting objects by iteratively calling a callback function as parameter.

External program can call the edge computing device ECD kernel via API "CQ API". The calling application can execute as a separate process on the same computer, or from a different peer or even an external entity, via some suitable communication system such as TCP. The calling application can also be in the form of one or several application threads. Thereby, the kernel guarantees thread safety.

Again with reference to FIG. 2, in some embodiments of the present invention the system 100 further comprises an interactive Graphical User Interface (GUI), allowing a user of the system 100 to visually view computer code of the present type, formatted according to said syntax. This viewed computer code is computer code stored in several different of said edge computing devices ECD, computer code which uses said syntax to define several different queries using said query language. Said several different queries may generally include interrelations between requesting 110 and responding 120, 130 edge computing devices defined by the queries in question as described above, also in complex query-defined cascading/tree configurations of the type discussed.

However, even though the GUI may also be arranged to display said computer code as alphanumeric text, in the embodiments now discussed the GUI is arranged to visualize said computer code using a visual notation system.

Namely, the query language may be isomorph to such a visual notation system, meaning that any query language computer code which follows said syntax will have a visual counterpart representation that can be visualized in said interactive GUI. In some embodiments, the isomorphism is partial, in the sense that a well-defined subset of the query language can be mapped one-to-one to a visual representation. Such well-defined subset is then preferably sufficient to define a set of desired tasks in terms of a set of queries in said query language, only using said well-defined subset. In some embodiments, any subset of said query language which is not mappable isomorphically to a visual representation may be indicated in a visual representation of mappable query code, for instance in the form of alphanumerical computer code snippets in logically correct locations in said visual representation. In particular, such code snippets can be used to represent details of the computer code the more high-level structure of which is represented using visual objects so that the result is a complete representation of the computer code, which representation is graphical on higher levels but may comprise lower-level parts that are shown as alphanumeric text such as computer code snippets. This visual notation system may be based on graphical primitives that have a well-defined one-to-one mapping to a computer code counterpart representation and are graphically interconnected, such as using lines or arrows, in a way representing how entities, data, calculations and queries are interconnected as defined by the query or queries defined by said computer code.

The isomorphism may be arranged so that the visual representation is more abstract than the actual computer code, hiding certain detail of the computer code such as particular calculations performed on particular data. However, it is preferred that the isomorphism is complete, meaning that the computer code can be completely represented by the visual notation system, and computer code and visual representation can be translated one to the other and back with no loss of information. One advantage of using a completely isomorph visual representation, however, is that the visual representation can be designed to support collapse/show functionality, so that chunks of detailed query information can be hidden or shown depending on the type of design process a user is currently performing, making it easy for the user to quickly view and highlight relevant parts and abstraction layers in the query language defining the system 100 behaviour, hiding any details or layers not being relevant for the task immediately at hand. Such collapse/show functionality may be offered by the GUI as an interactive part of the GUI, such as the user using a computer mouse to click on certain parts of the visually represented computer code to hide or show it.

The visual notation system may allow certain alphanumeric text, in particular regarding names of peers and data, and possibly also calculations. However, it is preferred that at least information flows; edge computing devices ECD; central servers CS; sensors S; data structures; are represented using graphical primitive elements in said GUI.

Furthermore, the interactive GUI may be arranged to allow said user to graphically and interactively, such as using a computer screen and a computer mouse; or a touchscreen, change/amend/define one or several of said queries using directly said visual notation system. For instance, the user may drag-and-drop individual edge computing devices ECD to define requesting and responding edge computing devices ECD, or may add queries, query parameters and logic using graphical primitives in said interactive GUI. It is noted here that, due to said isomorphism, such changes will always perfectly correspond to changes in the alphanumeric computer code which is graphically represented.

Then, the interactive GUI is arranged to, as a result of such changes, communicate said updated computer code to any concerned edge computing devices ECD, reflecting any updates made to the visual representation. This may mean that one or several edge computing devices ECD will be provided with updated queries; that one or several edge computing devices ECD are instructed that the previously loaded continuous query is no longer to be active; and/or that one or several edge computing devices ECD are provided with updated queries. This provision takes place in the way generally described herein, using corresponding central servers CS to automatically push out the updates in question to the edge computing devices ECD in question. Once updated, the concerned edge computing devices ECD may in general start using (interpreting) the loaded queries immediately. In particular in case such visually defined and loaded queries are continuous queries of the above-described type, this will result in that a change in the interactive GUI leads to an immediate and automatic full-scale deployment of computer logic at possibly large number of concerned edge computing devices ECD.

In some embodiments, the visual notation system also comprises elements representing the data flow in and between individual sensors S, edge computing devices ECD and/or central servers CS. In this case, such data flows can be divided into information sources (sensors S or responding edge computing devices ECD), information processors (edge computing devices ECD) and information sinks (actuators A, requesting edge computing device ECD or central servers CS). Such sources, processors and sinks may be graphically represented in the interactive GUI using particular symbols, that may also be arranged to signal a current state of the source, processor or sink (such as active/inactive) in question. It is preferred that the system 100 is arranged so that the interpreting software function ES continuously provides the interactive GUI (such as via its respective central server CS) with updated status regarding the status and information flows of the interpreting software function ES, so that the interactive GUI is updated in real-time or near real-time regarding the current status of the query programming and information flow in the system 100.

This way, the interactive GUI will be dynamically updated to show changed information flows based on queries initiating, running, stopping, and so forth. This means that, when the user changes the visual representation of the computer code using the interactive GUI, the changes are instantly translated into corresponding computer code and pushed to concerned edge computing devices ECD (possibly after automatic compilation of the computer code for very slimmed edge computing devices ECD). The pushed query information in turn gives rise to modified information flows of various kinds, that are immediately reflected, by the feedback information from the edge computing devices ECD in question, in the graphical GUI for the user to see.

In other word, the user can use computer mouse or touchscreen drag-and-drop techniques to interactively build and test complex queries involving large numbers of edge computing devices ECD, and more or less immediately see the results of the changes made in terms of actual resulting data and results of data processing, since the updated computer code is communicated to the one or several concerned edge computing devices ECD on-the-fly by the interactive GUI as it is iteratively defined.

In the particular case in which individual edge computing devices ECD accept subscriptions for internally processed information streams, such as raw data from a particular sensor S or the results of an internal calculation, such information streams can be represented in the visual notation system as information sources that can be used by the user of the interactive GUI for viewing the data flow or connecting such an information source to a sink or a processing unit.

In particular, the interactive GUI may be arranged to request, from each of the concerned edge computing devices ECD, computer code stored therein, and to provide said visual view based on computer code received from said edge computing devices ECD in response to this request.

The interactive GUI may be arranged to visualize the whole system 100 or only a selected subpart of the system 100, and may adapt both its collecting of updated information about data flow and query-defined topology as well as its real-time pushing of updated query information to only those parts of the system 100 that are currently viewed or selected in the GUI.

The interactive GUI may be arranged as a purely software-implemented functionality, that may run on any hardware platform that is connected to a suitable visualization equipment, such as a conventional monitor with a computer mouse or a touchscreen. The interactive GUI is also connected to network NW for communication with the central servers CS.

FIGS. 5a-5d show a concrete example of how the interactive GUI can be used to iteratively develop query language computer code to achieve a desired outcome in terms of data measurements and processing.

The basic setup in this example is that a number of edge computing devices ECD are located at different locations in a particular geographic zone, each such edge computing device ECD having at least one sensor S in the form of a respective three-axial accelerometer. All edge computing devices ECD are served by one single central server CS. It is realized that this example is heavily simplified, with the purpose of providing a pedagogic explanation of important principles of the present invention.

The desired outcome of the query-based programming performed in this example is to detect an ongoing earthquake, by exploiting the respective accelerometer sensor S of each such edge computing device ECD based on the principle that one individual edge computing device ECD can shake for any reason, while a simultaneous shaking of several or many of the edge computing devices ECD is indicative of an ongoing earthquake.

The user starts out by entering the following query language computer code (formatted according to a defined syntax of the type described herein). It is noted that the syntax in this example has similarities to the standard computer query language SQL, but that the code is not SQL code:

```
select is_shaking
        /* Projection */
    from stream of vector of number shakes,
        /* Declare shakes as stream of 3D
            vectors */
        stream of number magnitude,
        stream of number stdev,
        stream of number is_shaking,
        stream of vector shakings
    where shakes = accelerometer( )
        /* The stream shakes comes
            from the function accelerometer( ) */
    and magnitude = absolute(shakes)
        /* magnitude is a stream derived by
            calculating the magnitude of each
            vector in the stream accelerometer */
    and stdev = stdev(magnitude,50,5)
        /* Calculate moving standard
            deviation over the 50 last elements
            in the stream magnitude moving
            forward 5 elements for each new
            window */
    and is_shaking = shaking(stdev,2)
        /* The device is considered shaking
            when stdev > 2 */
    and shakes from detect_shake(shaking)
```

Note that this query is defined in terms of a desired result, namely is_shaking, a detected shaking event being 1 if the device is considered shaking and 0 otherwise. The is_shaking is in turn defined in terms of a function shaking, defining a shaking event as occurring when a particularly defined calculated standard deviation stdev of a sensor reading is above the value 2. The standard deviation stdev is in turn calculated, according to the definition given in the query, as a standard deviation of a moving window of magnitude data, the moving window being 50 data points long and moving 5 data points for each new window position. The magnitude, in turn, is calculated as the vector magnitude of a vector of the X, Y and Z accelerometer measurement values of the accelerometer sensor S of the edge computing device ECD to which the query is posed.

This computer code can be entered by the user into any suitable text editor, and deployed to a particular identified edge computing device ECD via the central server CS that serves the edge computing device ECD in question. For instance, this central server CS may provide a deployment API to accept such queries addressed to particular edge computing devices ECD, or such deployment API may be provided by the system 100 in a different centralized manner.

After deployment of this computer code onto the edge computing device ECD in question, the interpreting software function ES executing on that edge computing device ECD will immediately start parsing and interpreting the query in question, giving rise to an endless data stream of 0's and 1's, where a 0 indicates no currently detected shaking event and a 1 indicates a currently detected shaking event.

At any time after deployment, the above-described GUI may request current status from the edge computing device ECD in question, and then receive the computer code currently loaded therein, as well as receive access to continuously updated data streams. Such access may be in the form of a handle or similar manner for the GUI to tap into such a data stream, rather than be in the form of the data stream itself. This way, unnecessary data needs not be sent across the network NW as long as no one is requesting the data. Once the GUI requires a real-time updated view of such data streams, it will be sent via the serving central server CS in question to the GUI.

Once the GUI receives said status, the GUI automatically maps the computer code to a corresponding visual representation according to said isomorphic mapping.

Figure 5A:
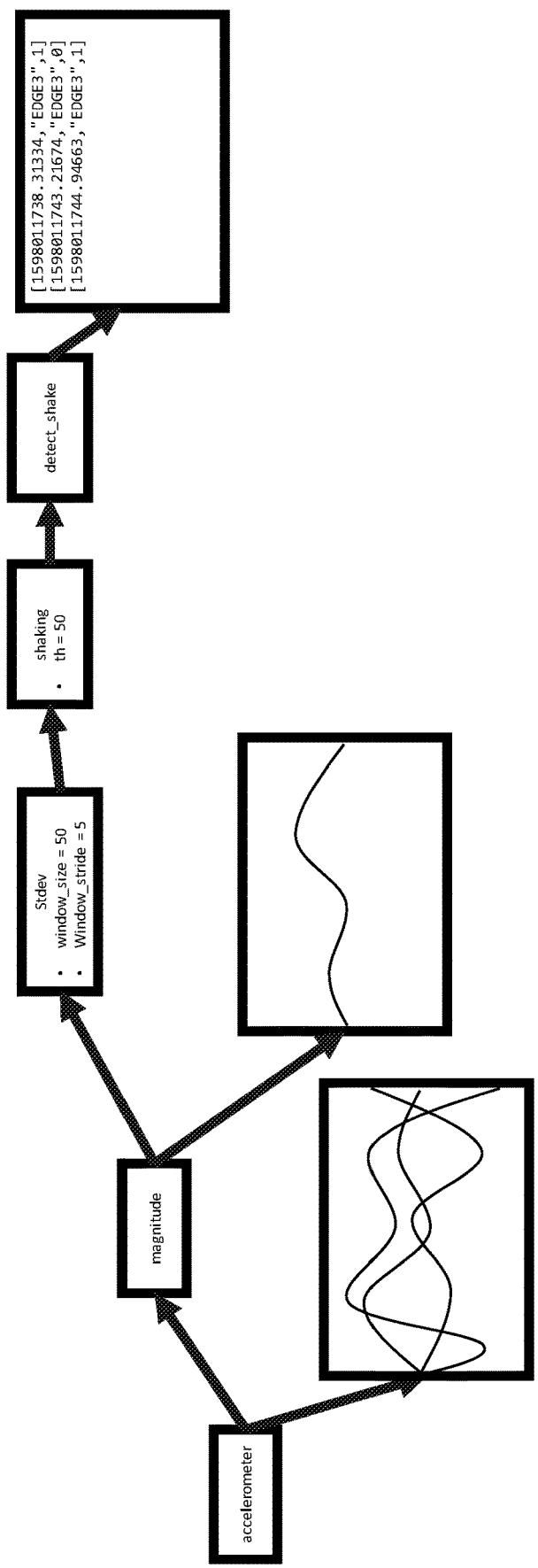
FIGS. 5a-5d are respective views of a graphical user interface, in consecutive states.

The result is shown in FIG. 5a, in which the accelerometer sensor S is shown as a box, interconnected with other boxes representing computer code definitions absolute, stdev, shaking and detect shake. Interconnecting lines represent logic connections between the boxes, in this case directed arrows representing data flow.

Interestingly, the user can view data streams on any level. In the example shown in FIG. 5a, the user has chosen to activate real-time views of the data produced by boxes accelerometer, magnitude and detect_shake. The first two are represented as respective real-time updated graphs (showing current readings of X/Y/Z accelerometer axes and a resulting magnitude, respectively), while the third one is represented as a text output window showing triplets time-deviceID-result. It is noted that the edge computing device ECD used in the example shown in FIG. 5a is dented "EDGE3" according to said global name standard as defined by the name server NS.

Hence, the deployed text-based computer code is picked up by the GUI, in turn automatically generating and presenting the view shown in FIG. 5a, providing the user with various possibilities to view, in real-time, not only the query logic but also the resulting data.

It is here noted that any well-defined data stream in the system 100 can be individually subscribed to and used in various data processing operations. A simple example of this is the following code, where a peer interpreting the code in question sets up a subscription to a data stream accelerometer from the edge computing device globally denoted EDGE3:

```
subscribe("EDGE3", "accelerometer")
    /* A stream from any edge device can
    be subscribed on from any other
    client using the built-in pub/sub
    mechanism. */
```

Figure 5B:
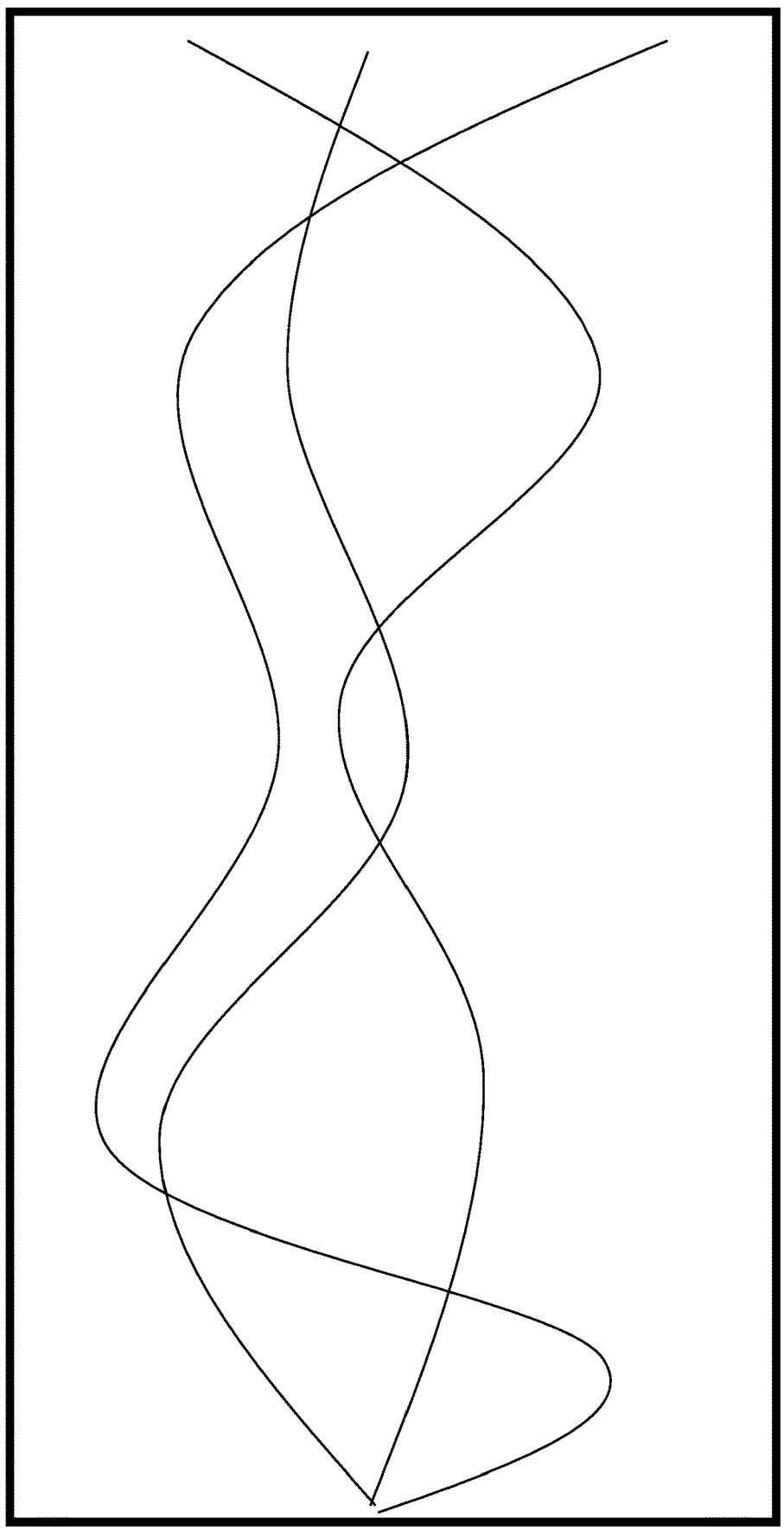

The resulting data stream can then be visually viewed by a user of the GUI, with the result as illustrated in FIG. 5b. It is noted that this view is identical to the left-most graph shown in FIG. 5a, which is because it is the same sensor S of the same edge computing device ECD which is tapped.

In a next step, the user of the GUI shown in FIG. 5a adds the following code and feeds it to either a central server CS running the interpreting software function ES or to any edge computing device ECD:

```
select same_time_shakes_9
  from stream edge_cq_5,
       stream edge_cq_6,
       stream of vector of number same_time_shake_status_7,
       stream of charstring same_time_shakes_9
  where edge_cq_5 = edge_cq("EDGE3","detect_shake(2)")
      /* This is the same as the previous
      query on the edge device2 */
  and edge_cq_6 = edge_cq("EDGE2","detect_shake(2)")
  and same_time_shake_status_7
      = same_time_shake_status([edge_cq_5,edge_cq_6])
      /* Combine the stream from the edges
      into one */
  and same_time_shakes_9
      = same_time_shakes(same_time_shake_status_7)
```

Here, the previously defined query detect_shake is used to query the edge computing device ECD EDGE3 for a continuous data stream in which 1 represents an ongoing shaking event and 0 represents that such a shaking event is not ongoing in that edge computing device ECD.

The query detect_shake is also used to query another edge computing device ECD EDGE2 for a corresponding continuous data stream, representing the current shaking event status for that edge computing device ECD.

The result from these two queries are fed into a defined logic same_time_shake_status, combining the result of several such data streams to produce a tuple (X,Y), where X is the currently updated detect_shake from EDGE3 and Y is the currently updated detect_shake from EDGE2.

The result from same_time_shake_status is then fed into logic same_time_shake, which is defined to determine if an earthquake is likely presently ongoing in a predetermined manner. For instance, _time_shake_status may return the value "shake" if a majority of the values of the respective data streams at the moment are set to 1, otherwise "calm".

It is here noted that the posting of this query to any peer running the interpreting software function ES, such as any edge computing device ECD or to any central server CS running the interpreting software function ES, will result in that peer in turn automatically posing the detect_shake query to edge computing devices EDGE3 and EDGE2, that in turn will parse and interpret this query to produce a respective data stream of the type described above in relation to FIG. 5a which is then fed back to said peer for processing.

Figure 5C:
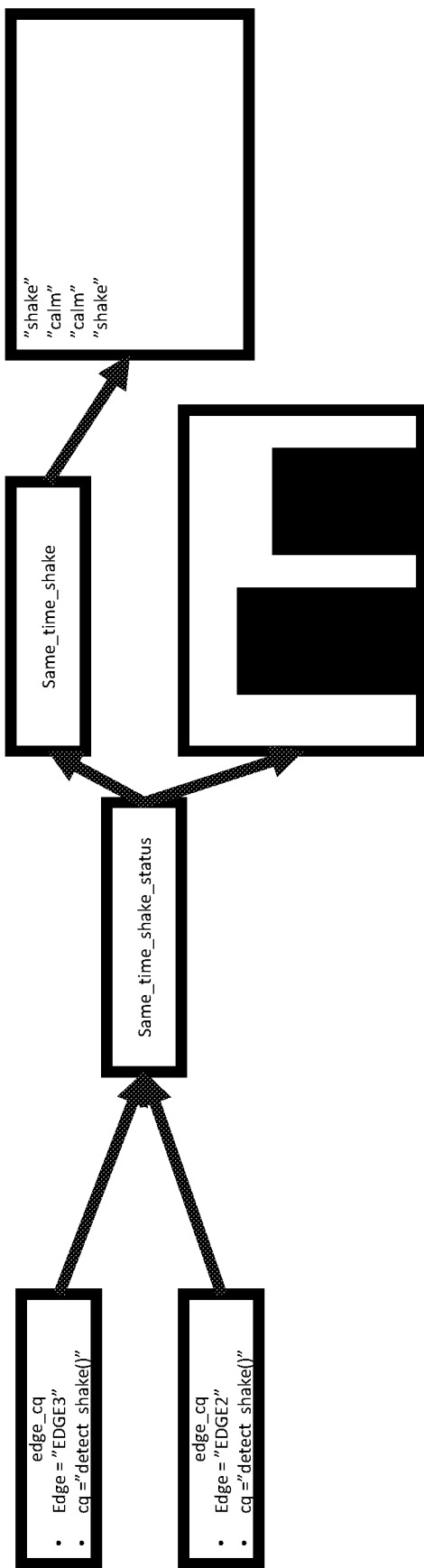
Figure 5D:
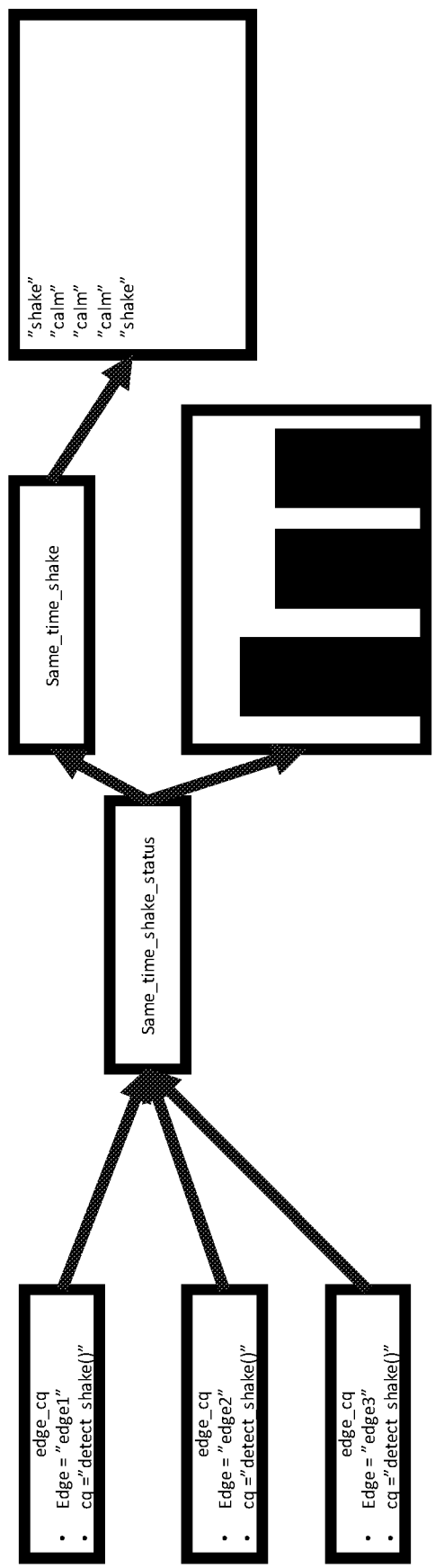

FIG. 5c illustrates the view in the GUI after the GUI has requested updated information from the affected peers and mapped the computer code in question to a corresponding visual representation. It is noted that this view does not show the details of what happens within edge computing devices EDGE3 and EDGE2—this visual information has been collapsed by the user in the presented view to allow the user to focus on the important part of the query topology. However, using the GUI the user would be able to drill down into each of the edge computing devices EDGE3 and EDGE2, each being depicted in a manner roughly corresponding to the view shown in FIG. 5a.

As is illustrated in FIG. 5c, the real-time updated data stream output from same_time_shake_status has been selected by the user for graphical representation, in this case in the form of a bar chart showing a tall bar as "1" and a short bar as "0" for each of the data tuple in question.

Then, the user uses the GUI to drag-and-drop a third edge computing device EDGE1 as an input provider to same_time_shake_status. This will result in that the GUI automatically pushes the following updated code (updates in bold) to the affected peers in the system 100:

```
select same_time_shakes_9
  from stream edge_cq_5,
       stream edge_cq_6,
       stream edge_cq_10
       stream of vector of number same_time_shake_status_7,
       stream of charstring same_time_shakes_9
  where edge_cq_5 = edge_cq("EDGE3","detect_shake(2)")
       /* This is the same as the previous
          query on the edge device2 */
    and edge_cq_6 = edge_cq("EDGE2","detect_shake(2)")
    and same_time_shake_status_7
       = same_time_shake_status([edge_cq_5,edge_cq_6])
       /* Combine the stream from the edges
          into one */
    and same_time_shakes_9
       = same_time_shakes(same_time_shake_status_7)
    and edge_cq_10 = edge_cq("EDGE1","detect_shake(2)")
```

Hence, now a third edge computing device ECD, denoted "EDGE1" in said global namespace, has been added in parallel to the already-existing EDGE2 and EDGE3. It is noted that the GUI here automatically maps the updated visual view (visually edited by the user in the GUI) to the corresponding computer code, and that it is this automatically produced computer code which is pushed to the concerned edge computing devices ECD as described above, in plaintext of precompiled and including any cascading effects.

This way, the user can iteratively program the whole system 100 based on query language computer code that is specified alphanumerically or visually, using alphanumerical and/or visual amendments that more or less immediately result in updated data streams that are visible for analysis by the user of the GUI.

Figure 6:
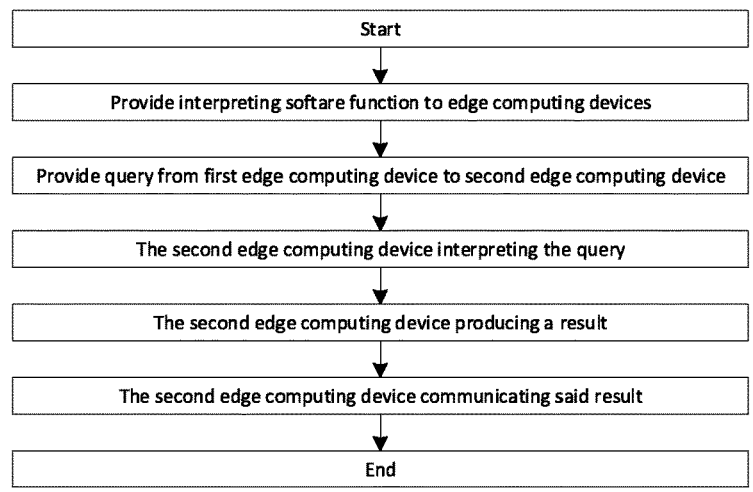
FIG. 6 is a flowchart illustrating a first method.

FIG. 6 illustrates a method for collecting data in the system 100.

In a first step, the method starts.

In a subsequent step, at least a first 110 and a second 120 ones of the plurality of edge computing devices ECD comprised in the system 100 are provided with a respective interpreting software function ES of the general type discussed herein, arranged to execute on the CPU of the edge computing device ECD in question and to interpret computer code of the type discussed herein, received via the digital communication interface IF of the edge computing device ECD in question and stored in the memory M of the edge computing device ECD in question. Said computer code is according to a query language of the present type, having a predetermined syntax in turn being arranged to define queries the results of which are streams of data.

In a subsequent step, a first one 110 of said edge computing devices ECD provides to a second one 10 of said edge computing devices ECD, via the digital communication interface of the second edge computing device 120, computer code of said type defining at least one query using said syntax.

In a subsequent step, said second edge computing device interprets the received, the interpretation comprising the second edge computing device 120 performing a calculation based on a measured value from a sensor S of the second edge computing device, and the query being defined in terms of the calculation to be performed.

In a subsequent step, the second edge computing device produces a result to said at least one query.

In a subsequent step, the second edge computing device communicates said result via said digital communication interface IF of the second edge computing device 120 to said first edge computing device 110.

It is understood that, in this and in other embodiment examples, communication between edge computing devices ECD may in general take place via the respective digital communication interface IF of each of the involved edge computing devices ECD in the communication in question, and also via any involved intermediary central servers CS.

In a subsequent step, the method ends.

Figure 7:
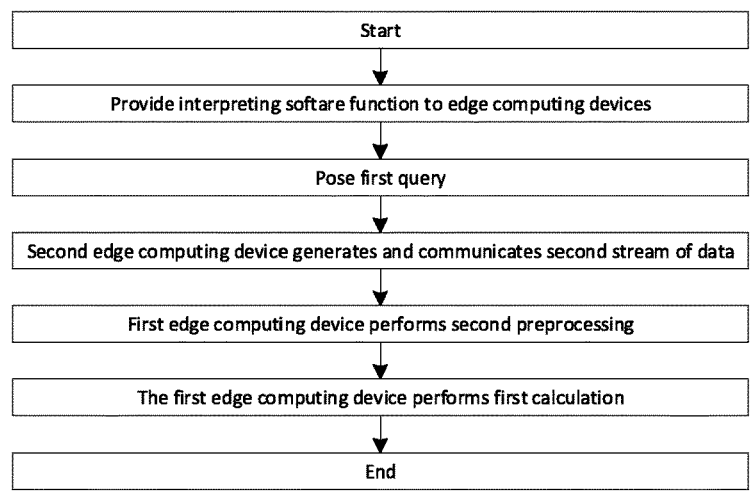
FIG. 7 is a flowchart illustrating a second method.

FIG. 7 illustrates a method for collecting data in the system 100. Again, the system 100 comprises at least a first edge computing device 110 and a second edge computing device 120.

In a first step, the method starts.

In a subsequent step, at least said first 110 and second 120 edge computing devices are provided with a respective interpreting software function ES of the present type, arranged to execute on the CPU of the edge computing device in question ECD and to interpret computer code of the present type, which code is received via the digital communication interface IF of the edge computing device ECD in question and stored in the memory M of the edge computing device ECD in question, according to a query language of the present type having a predetermined syntax, said syntax being arranged to define queries the results of which are streams of data.

In a subsequent step, a first interpreting software function ES of said type, executing on the first edge computing device 110, poses a first query of said type to the second edge computing device 120.

In a subsequent step, a second interpreting software function ES of said type, executing on the second edge computing device 120, in response to said first query being received by the second edge computing device 120, generates a second stream of data (the term "second stream of data" simply denoting a stream of data produced by the "second" edge computing device 120). The second edge computing device 120 communicates this second stream of data back to the first edge computing device 110, via the digital communication interface IF of the first edge computing device ECD.

In a subsequent step, the first interpreting software function ES performs a preprocessing (a "second" preprocessing, denoted this way since it is performed on the "second" stream of data) of said second stream of data, resulting in a preprocessed second stream of data used in said first calculation. This second preprocessing transforms the second stream of data so that it adheres to a predefined global data ontology of the type described herein.

In a subsequent step, the first interpreting software function ES performs a first calculation using said preprocessed second stream of data to calculate a first result.

In a subsequent step, the method ends.

Figure 8:
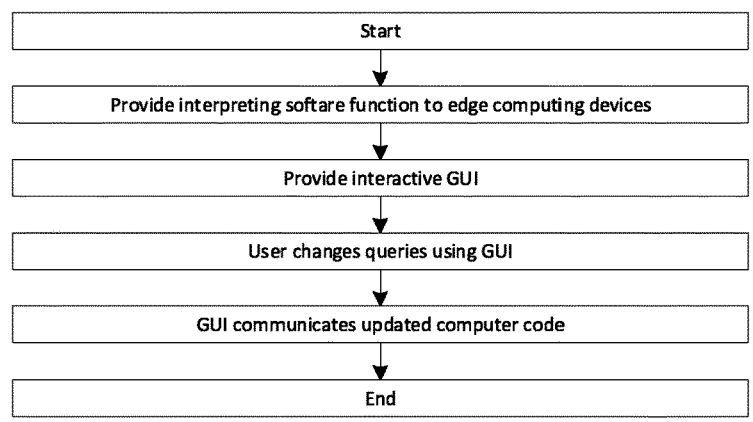
FIG. 8 is a flowchart illustrating a third method.

FIG. 8 illustrates a method for collecting data in the system 100 comprising several edge computing devices ECD of the present type.

In a first step, the method starts.

In a subsequent step, each of said plurality of edge computing devices ECD is provided with a respective interpreting software function ES of the type described herein, arranged to execute on the CPU of the edge computing device ECD in question and to interpret computer code, received via the digital communication interface IF of the edge computing device ECD in question and stored in the memory M of the edge computing device ECD in question, according to a query language of the present type, having a predetermined syntax being arranged to define queries sent from a respective requesting edge computing device ECD to one or several respective responding edge computing devices ECD, in terms of respective calculations to be performed by the responding edge computing devices ECD in question based on a measured value from a respective sensor S of the responding edge computing device ECD, the results of which queries are streams of data returned to the requesting edge computing device ECD. The query language is isomorph to a visual notation system of the type and in the way described above.

In a subsequent step, an interactive Graphical User Interface (GUI) of the type described above is provided, allowing a user of the system 100 to visually view computer code stored in several different of said edge computing devices ECD using said syntax and defining several queries using said query language, including interrelations between requesting and responding edge computing devices ECD defined by the queries in question, using said visual notation system.

In a subsequent step, the user uses said interactive GUI to graphically and interactively change one or several of said queries using said visual notation system.

In a subsequent step, the interactive GUI as a result automatically communicates updated computer code of said type to any concerned edge computing devices ECD reflecting said changes to the queries.

In a subsequent step, the method ends.

Above, preferred embodiments have been described. However, it is apparent to the skilled person that many modifications can be made to the disclosed embodiments without departing from the basic idea of the invention.

For instance, the edge computing devices ECD may take many different forms in terms of hardware and software platforms. Since the interpreting software function ES is easily ported and can run in a way essentially independent from the details of its environment (much like Java code), it can be deployed and operated on nearly any general-purpose programmable hardware which is connected to the internet. One and the same system 100 may comprise many different types of edge computing devices ECD without having to take special consideration to other things than hardware limitations of each edge computing device ECD.

The above description describes numerous different embodiments. In general, all embodiments are freely combinable as long as nothing else is said and as long as they are compatible. This should frequently be the case.

Hence, the invention is not limited to the described embodiments, but can be varied within the scope of the enclosed claims.

The invention claimed is:

1. A method for collecting data in a system comprising a plurality of edge computing devices, each edge computing device comprising a respective sensor, a respective memory, a respective central processing unit, and a digital communication interface arranged to allow the edge computing device to communicate digitally across a digital communication network, wherein the method comprises the steps:
   a) providing each of the plurality of edge computing devices with a respective interpreting software function, arranged to execute on the central processing unit of the edge computing device and to interpret computer code, received via the digital communication interface of the edge computing device and stored in the memory of the edge computing device, according to a query language having a predetermined syntax, the syntax being arranged to define queries sent from a respective requesting edge computing device to one or several respective responding edge computing devices, in terms of respective calculations to be performed by the responding edge computing devices based on a measured value from a respective sensor of the responding edge computing device, wherein executing the queries results in streams of data being returned to the requesting edge computing device, and the query language being isomorph to a visual notation system;
   b) providing an interactive graphical user interface allowing a user of the system to visually view computer code stored in several different of the edge computing devices using the syntax and define the queries using the query language, including interrelations between the requesting and responding edge computing devices defined by the queries, using the visual notation system;
   c) the user using the interactive graphical user interface to graphically and interactively change one or several of the queries using the visual notation system;
   d) the interactive graphical user interface as a result communicating, via the respective digital communication interface of the edge computing device, updated computer code to any concerned edge computing devices reflecting the changes; and
   e) the interactive graphical user interface receiving, from the edge computing devices, computer code stored therein, and providing the visual view based on the computer code received from the edge computing devices.

2. A system comprising a plurality of edge computing devices (ECD), each edge computing device comprising:
   a sensor;
   a memory;
   a central processing unit; and
   a digital communication interface, arranged to allow the edge computing device to communicate digitally across a digital communication network,
   wherein
   each edge computing device is arranged with a respective interpreting software function, arranged to execute on the central processing unit and to interpret computer code, received via the digital communication interface and stored in the memory, according to a query language having a predetermined syntax;
   the syntax is arranged to define queries sent from a respective requesting edge computing device to one or several respective responding edge computing devices, in terms of respective calculations to be performed by the responding edge computing devices based on a measured value from a respective sensor of the responding edge computing device, wherein executing the queries results in streams of data being returned to the requesting edge computing device;
   the query language is isomorph to a visual notation system;
   the system further comprises an interactive graphical user interface, allowing a user of the system to visually view computer code stored in several different of the edge computing devices using the syntax and define the queries using the query language, including interrelations between the requesting and responding edge computing devices defined by the queries, using the visual notation system;
   the interactive graphical user interface is further arranged to allow the user to graphically and interactively change one or several of the queries using the visual notation system, and wherein the interactive graphical user interface as a result is arranged to communicate, via the respective digital communication interface of the edge computing device, updated computer code to any concerned edge computing devices reflecting the changes; and the interactive graphical user interface is further arranged to receive, from the edge computing devices, computer code stored therein, and to provide the visual view based on computer code received from the edge computing devices.

3. The system of claim 2, wherein the updated computer code is communicated to the concerned edge computing device or devices on-the-fly by the interactive graphical user interface.

4. The system of claim 2, wherein the visual notation system is based on graphical primitives that have a well-defined one-to-one mapping to a computer code counterpart representation according to the syntax and are graphically interconnected in a way representing how entities, data, calculations and queries are interconnected as defined by one or more queries.

5. The system of claim 2, wherein the memory stores computer code in a plaintext format or a precompiled format.

6. The system of claim 2, wherein the streams of data are streams of data objects, including one of: numbers, tensors or objects representing individual edge computing devices.

7. The system of claim 2, wherein each sensor and/or edge computing device is referable, according to the syntax, using a global namespace.

8. The system of claim 7, wherein the system further comprises a central namespace server arranged with a database comprising information defining names for the edge computing devices.

9. The system of claim 8, wherein the database further comprises information regarding network address locations for each of the edge computing devices.

10. The system of claim 7, wherein a stream of objects of a result is an endless stream of objects, calculated by the edge computing device continuously or intermittently over time and communicated via the digital communication interface.

11. The system of claim 7, wherein the syntax allows a query to refer to information received by the requesting edge computing device from the responding edge computing device via the global namespace, the information then being used by the interpreting software function executing on the requesting device to calculate a result, wherein the interpreting software function executing on the requesting device is arranged to cause the requesting edge computing device to query the information from the responding edge computing device, as a consequence of the query referring to the responding edge computing device or to the sensor comprised therein.

12. The system of claim 11, wherein the result of a query made by the requesting edge computing device comprises an endless stream of objects received by the requesting edge computing device from the responding edge computing device, calculated by the responding edge computing device continuously or intermittently over time and communicated to the requesting edge computing device via the digital communication interface of the requesting edge computing device.

13. The system of claim 2, wherein different ones of the edge computing devices comprise different hardware configurations, in that the interpretation software function is specifically adapted to the respective hardware configuration of each of the different edge computing devices, and wherein the syntax is identical for each of the different edge computing devices.

14. The system of claim 2, wherein the interpreting software function of a first edge computing device is arranged to, using the query language, accept a subscription request from an alpha edge computing device for an individual query processed by the interpreting software function of the first edge computing device, wherein the alpha edge computing device did not pose the query to the first edge computing device.

15. The system of claim 2, wherein the syntax allows for different conditional logic-depending execution paths, interpreted and executed by the interpreting software function.

16. The system of claim 2, wherein the query language is partly procedural.

17. The system of claim 2, wherein the system further comprises a distributed or monolithic central server, in relation to which each of the edge computing devices has a client role, and wherein all communication between individual edge computing devices takes place via the central server.

18. The system of claim 2, wherein the interpreting software function, according to the query language, comprises an external Application Programming Interface arranged to allow expressions in the query language to call external computer code and/or arranged to allow external computer code to call the expressions in the query language.

* * * * *